United States Patent
Swaminathan et al.

(10) Patent No.: US 10,325,183 B2
(45) Date of Patent: Jun. 18, 2019

(54) POISSON-BINOMIAL BASED IMAGE RECOGNITION METHOD AND SYSTEM

(71) Applicant: TEMASEK LIFE SCIENCES LABORATORY LIMITED, Singapore (SG)

(72) Inventors: Muthukaruppan Swaminathan, Singapore (SG); Tobias Sjoblom, Uppsala (SE); Ian Cheong, Singapore (SG); Obdulio Piloto, Coral Gables, FL (US)

(73) Assignee: Temasek Life Sciences Laboratory Limited, Singapore (SG)

( * ) Notice: Subject to any disclaimer, the term of this patent is extended or adjusted under 35 U.S.C. 154(b) by 38 days.

(21) Appl. No.: 15/511,089

(22) PCT Filed: Sep. 15, 2015

(86) PCT No.: PCT/SG2015/050317
§ 371 (c)(1),
(2) Date: Mar. 14, 2017

(87) PCT Pub. No.: WO2016/043659
PCT Pub. Date: Mar. 24, 2016

(65) Prior Publication Data
US 2017/0249535 A1    Aug. 31, 2017

Related U.S. Application Data

(60) Provisional application No. 62/050,414, filed on Sep. 15, 2014.

(51) Int. Cl.
*G06K 9/00* (2006.01)
*G06K 9/46* (2006.01)
(Continued)

(52) U.S. Cl.
CPC ....... *G06K 9/6276* (2013.01); *G06K 9/00986* (2013.01); *G06K 9/52* (2013.01);
(Continued)

(58) Field of Classification Search
CPC .............................. G06K 9/6276; G06K 9/52
See application file for complete search history.

(56) References Cited

U.S. PATENT DOCUMENTS 9,129,148 B1 *   9/2015  Li ....................... G06K 9/00268
2008/0306898 A1 * 12/2008  Tsypin ................. G06F 19/707
                                                            706/61
(Continued)

OTHER PUBLICATIONS

Wettschereck et al., "Locally adaptive nearest neighbor algorithms", Advances in Neural Information Processing Systems. 1994.*
(Continued)

*Primary Examiner* — Vincent Rudolph
*Assistant Examiner* — Pinalben Patel
(74) *Attorney, Agent, or Firm* — Cooley LLP

(57) ABSTRACT

An improved system and method for digital image classification is provided. A host computer having a processor is coupled to a memory storing thereon reference feature data. A graphics processing unit (GPU) having a processor is coupled to the host computer and is configured to obtain, from the host computer, feature data corresponding to the digital image; to access, from the memory, the one or more reference feature data; and to determine a semi-metric distance based on a Poisson-Binomial distribution between the feature data and the one or more reference feature data. The host computer is configured to classify the digital image using the determined semi-metric distance.

24 Claims, 12 Drawing Sheets

(51) Int. Cl.
*G06K 9/52* (2006.01)
*G06K 9/62* (2006.01)

(52) U.S. Cl.
CPC .......... *G06K 9/627* (2013.01); *G06K 9/6215* (2013.01); *G06K 2009/4666* (2013.01)

(56) References Cited

U.S. PATENT DOCUMENTS

| | | | | |
|---|---|---|---|---|
| 2010/0177956 | A1* | 7/2010 | Cooper | G06K 9/00664 382/159 |
| 2015/0161474 | A1* | 6/2015 | Jaber | G06K 9/52 382/203 |
| 2016/0314579 | A1* | 10/2016 | Ghouti | G06T 7/0012 |

OTHER PUBLICATIONS

Chester, U. et al., "Machine Learning for Image Classification and Clustering Using a Universal Distance Measure," SISAP 2013, LNCS, vol. 8199, pp. 59-72.

International Search Report and Written Opinion dated Nov. 6, 2015 from International Application No. PCT/SG2015/050317, 8 pages.

Ozdemir, B., "Structural Scene Analysis of Remotely Sensed Images using Graph Mining," Master's Thesis, Bilkent University, Ankara, Turkey, Jul. 20, 2010, 113 pages.

Pele, O., "Distance Functions: Theory, Algorithms and Applications," Thesis submitted for the degree of Doctor of Philosophy, Hebrew University, Jul. 2011, 163 pages.

Srivastava, A. et al., "On Advances in Statistical Modeling of Natural Images," Journal of Mathematical Imaging and Vision 2003, 18, pp. 17-33.

Extended European Search Report dated Apr. 17, 2018 for European Application No. 15842878.9, 10 pages.

Francois, D. et al., "The Concentration of Fractional Distances," IEEE Transactions on Knowledge and Data Engineering, vol. 19, No. 7, pp. 1041-4347 (Jul. 2007).

Gupta, A., "Metric Methods," $9^{th}$ Max-Planck Advanced Course on the Foundations of Computer Science (ADFOCS), retrieved from the Internet on Apr. 6, 2018: <URL: http://resources.mpi-inf.mpg.de/conferences/Adfocs08/Gupta-handout1.pdf, 4 pages (Aug. 2008).

Priscariu, V. A. et al., "fastHOG—a real-time GPU implementation of HOG," retrieved from the Internet: <URL: http://www.robots.ox.ac.uk/~lav/Papers/priscariu_reid_tr2310_09/priscariureidtr2310_09.pdf, 13 pages (Jul. 14, 2009).

Wilm, A. et al., "LoFreq: a sequence-quality aware, ultra-sensitive variant caller for uncovering cell-population heterogeneity from high-throughput sequencing datasets," Nucleic Acids Research; doi:10.1093/nar/gks918, pp. 1-13 (Oct. 18, 2012).

Witten, D. M., "Classification and clustering of sequencing data using a Poisson model," The Annals of Applied Statistics, vol. 5, No. 4, pp. 2493-2518; arXiv:1202.6201v1 (Feb. 28, 2012).

* cited by examiner

POISSON-BINOMIAL BASED IMAGE RECOGNITION METHOD AND SYSTEM

BACKGROUND OF THE INVENTION

Field of the Invention

The present invention relates generally to improved systems and methods for image recognition. More particularly, the present invention relates to systems and methods for pattern recognition in digital images. Even more particularly, the present invention relates to systems and methods for performing image classification and recognition functions utilizing a new and novel semi-metric distance measure called the Poisson-Binomial Radius (PBR) based on the Poisson-Binomial distribution.

Description of the Related Art

Machine learning methods such as Support Vector Machines (SVM), principal component analysis (PCA) and k-nearest neighbors (k-NN) use distance measures to compare relative dissimilarities between data points. Choosing an appropriate distance measure is fundamentally important. The most widely used measures are the sum of squared distances ($L_2$ or Euclidean) and the sum of absolute differences ($L_1$ or Manhattan).

The question of which to use can be answered from a maximum likelihood (ML) perspective. Briefly stated, $L_2$ is used for data which follows an i.i.d Gaussian-distribution, whereas $L_1$ is used in the case of i.i.d Laplace-distributed data. See [1], [2]. Consequently, when the underlying data distribution is known or well estimated, the metric to be used can be determined.

The problem arises when the probability distributions for input variables are unknown or non-identical. Taking image acquisition as an example, images captured by modern digital cameras are always corrupted by noise. See [3]. For example, the output of a charge-coupled device (CCD) sensor carries a variety of noise components such as photon noise, fixed-pattern noise (FPN) along with the useful signal. See [4]. Moreover, images are prone to corruption by noise during signal amplification and transmission. See [5]. Some of the most common types of noise found in the literature are additive, impulse or signal-dependent noise. However, the type and amount of noise generated by modern digital cameras tends to depend on specific details such as the brand and series name of the camera in addition to camera settings (aperture, shutter speed, ISO). See [6]. Further, image file format conversions and file transfers resulting in the loss of metadata can add to this problem. Even if the captured image appears to be noise-free, it may still consist of noise components unnoticeable to the human eye. See [7]. Given that feature descriptors are subject to such heterogeneous noise sources, it is reasonable therefore to assume that such descriptors are independent but non-identically distributed (i.n.i.d). See [8].

Inherent in most distance measures is the assumption that the input variables are independent and identically distributed (i.i.d). Recent progress in biological sequencing data analysis and other fields have demonstrated that in reality, input data often does not follow the i.i.d assumption. Accounting for this discrepancy has been shown to lead to more accurate decision-based algorithms.

Several threads have contributed to the development of semi-metric distance measures. The first relates to the axioms which need to be satisfied by distance measures in order to qualify as distance metrics. These are the axioms of non-negativity, symmetry, reflexivity and the triangle inequality. Measures which do not satisfy the triangle inequality axiom are by definition called semi-metric distances.

Although distance metrics are widely used in most applications, there have been good reasons to doubt the necessity for some of the axioms, especially the triangle equality. For example, it has been shown that the triangle inequality axiom is violated in a statistically significant manner when human subjects are asked to perform image recognition tasks. See [9]. In another example, distance scores produced by the top performing algorithms for image recognition using the Labelled Faces in the Wild (LFW) and Caltech101 datasets have also been shown to violate the triangle inequality. See [10].

Another thread involves the "curse of dimensionality." As the number of dimensions in feature space increases, the ratio of distances of the nearest and farthest neighbors to any given query tends to converge to unity for most reasonable data distributions and distance functions. See [11]. The poor contrast between data points implies that nearest neighbor searches in high dimensional space become insignificant. Consequently, the fractional $L_p$ semi-metric [12] was created as a means of preserving contrast. If $(x_i, y_i)$ is a sequence of i.i.d. random vectors, the $L_p$ distance is defined as:

$$L_p(x, y) = \left( \sum_{i=1}^{n} |x_i - y_i|^p \right)^{1/p} \quad (1)$$

Taking p=1 gives the Manhattan distance and p=2, the Euclidean distance. For values of p ε (0,1), $L_p$ gives the fractional $L_p$ distance measure.

In a template matching study for face and synthetic images comparing the $L_p$ and $L_2$ distances, it was concluded that values of p ε (0.25,0.75) outperformed $L_2$ when images were degraded with noise and occlusions. See [13]. Other groups have also used $L_p$ distance to match synthetic and real images. See [14]. The idea of using $L_p$ distance for content-based image retrieval has been explored by Howarth et al [15] and results suggest that p=0.5 might yield improvements in retrieval performance and consistently outperform both the $L_1$ and $L_2$ norms.

Other semi-metric distances worth mentioning are the Dynamic Partial Function (DPF) [16], Jeffrey Divergence (JD) [17] and Normalized Edit Distance (NED) [18].

To date, no distance measure has been demonstrated in pattern recognition to handle i.n.i.d. distributions. Thus, there is a need for improved systems and methods for pattern recognition.

SUMMARY OF THE INVENTION

According to the present invention, systems and methods for pattern recognition are provided that utilize a new semi-metric distance which is called the Poisson-Binomial Radius (PBR) based on the Poisson-Binomial distribution. The present invention provides numerous non-limiting advantages. For example, the present invention includes a robust semi-metric which avoids the i.i.d. assumption and accounts for i.n.i.d. feature descriptors and further demonstrates robustness to degradation in noisy conditions. Moreover, the present invention improves the efficiency of the pattern recognition device itself by reducing processing and improving efficiency.

According to aspects of the present invention, the systems and methods are suitable for real-time applications. For example, according to embodiments of the present invention, implementation features are parallelized using a Graphics Processing Unit (GPU).

According to other aspects of the present invention, a new classifier is introduced which achieves high classification accuracies despite small training sample sets. According to other aspects of the present invention, the classifier can be easily generalized to handle more classes without need for a training phase or cross-validation for optimization.

According to aspects of the present invention, a new distance measure for pattern recognition is based on the Poisson-Binomial distribution, which avoids the assumption that inputs are identically distributed. The inventors have tested this new measure in experiments described herein. One experiment was a binary classification task to distinguish between digitized human and cat images, and another was the identification of digitized images of ears compiled from two image libraries. In both these experiments, the performance of this measure was compared against Euclidean, Manhattan and fractional $L_p$ distance measures. Feature extraction for these two experiments was accomplished using GPU-parallelized Histogram of Oriented Gradients (HOG) to capture shape and textural information.

The inventors demonstrated that the present invention consistently outperforms the pattern recognition methods using the prior art distance measures mentioned above. Moreover, the results show that the proposed distance measure can improve the effectiveness of machine learning algorithms.

According to aspects of the present invention, an image classification system is provided. The system includes a GPU for performing calculation of HOG features for a received image and comparing the calculated HOG features to the store HOG features of training images. The system classifies the image based on the closest matching training image based on PBR.

According to aspects of the present invention, the image classification system can be used to discriminate cancer cells from normal cells.

According to aspects of the present invention, the image classification system can be used to match finger prints.

According to aspects of the present invention, the image classification system can be used to identify rare variants in DNA or RNA sequencing data.

According to aspects of the present invention, the image classification system can be used to recognize faces.

According to aspects of the present invention, PRICoLBP may be used as an alternative to HOG. Similarly, SVM kernel may be used as an alternative to kNN.

Further applications and advantages of various embodiments of the present invention are discussed below with reference to the drawing figures.

Figure 1A:
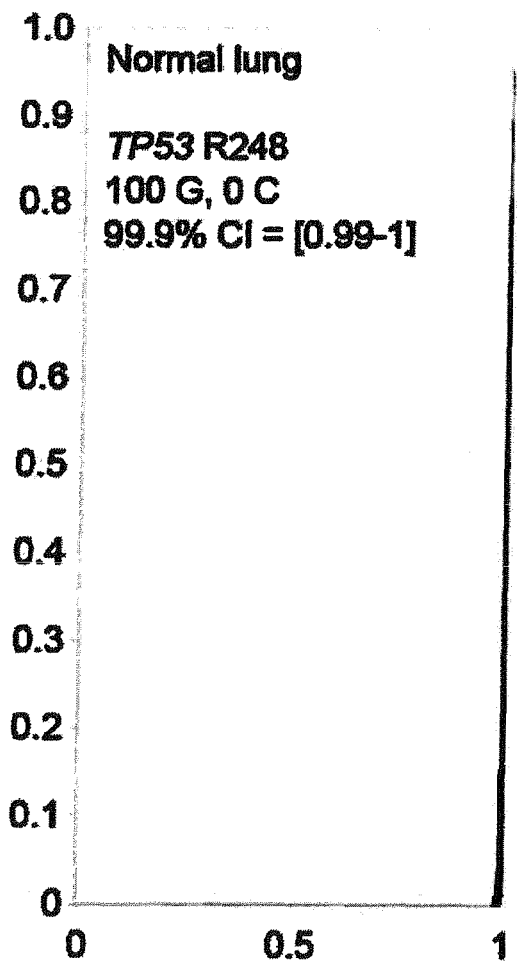
FIGS. 1a and 1b illustrate the output probability mass function for DNA sequencing analysis.

While the present invention may be embodied in many different forms, a number of illustrative embodiments are described next with reference to the above-described figures, with the understanding that the present disclosure is to be considered as providing examples of the principles of the invention and such examples are not intended to limit the invention to preferred embodiments described herein and/or illustrated herein.

DETAILED DESCRIPTION OF THE PREFERRED EMBODIMENTS

The Poisson-Binomial distribution is defined by the probability mass function for n successes given independent but non-identical probabilities $(p_1, \ldots, p_N)$ of success. These events exist in a probability space $(\Omega, F, P)$. The distribution is unimodal with mean $\mu$ being the summation of $p_i$ where i increments from 1 to N, and variance $\sigma^2$ being the summation of $(1-p_i)p_i$ where i increments from 1 to N.

A special case of this distribution is the binomial distribution where $p_i$ has the same value for all i. The Poisson-Binomial distribution may be used in a broad range of fields such as biology, imaging, data mining, bioinformatics, and engineering. While it is popular to approximate the Poisson-Binomial distribution to the Poisson distribution. This approximation is only valid when the input probabilities are small as evident from the bounds on the error defined by Le Cam's theorem [19] given by $$\sum_{n=0}^{\infty} \left| P(\Omega_n) - \frac{\lambda_N^n e^{-\lambda_N}}{n!} \right| < 2 \sum_{i=1}^{N} p_i^2. \tag{2}$$

where $P(\Omega_n)$ gives the probability of n successes in the Poisson-Binomial domain and $\lambda$ is the Poisson parameter.

The Poisson-Binomial distribution has found increasing use in research applications. Shen et al [20] developed a machine learning approach for metabolite identification from large molecular databases such as KEGG and PubChem. The molecular fingerprint vector was treated as Poisson-Binomial distributed and the resulting peak probability was used for candidate retrieval. Similarly, Lai et al. [21] developed a statistical model to predict kinase substrates based on phosphorylation site recognition. Importantly, the probability of observing matches to the consensus sequences was calculated using the Poisson-Binomial distribution. Other groups [22], [23] have used this distribution to identify genomic aberrations in tumor samples.

Since the probability of an aberration event varies across samples, individual DNA base positions are treated as independent Bernoulli trials with unequal success probabilities for ascertaining the likelihood of a genetic aberration at every position in each sample. Following the same reasoning, models to accurately call rare variants [24], [25] have been proposed.

The present invention seeks, among other things, to improve the accuracy of DNA sequencing analysis based on sequencing quality scores. Each score made available for every single sequenced DNA base reflects the probability that the output value was correctly called. For example, if there are N independent reads for a particular position, then sequence analysis software will generate a quality score $q_i$ for each read at that position which takes into account the probability of read errors. The implied probability of a correct read is given by $$p_i = 1 - 10^{-\frac{q_i}{10}} \text{ where } i \in [1, N] \quad (3)$$

Because the identity of each sequenced position is called based on multiple reads of the same position, sometimes numbering in the thousands, each read was treated as a Bernoulli event and sought to build a probability distribution for each sequenced position using the relevant quality scores for that position. Efficient ways to compute this probability distribution were found and are described below.

Using Waring's Theorem

Define $p_1, \ldots, p_N$ as describing independent but non-identical events which exist in a probability space $(\Omega, F, P)$. $Z_k$ is furthered defined as the sum of all unique k-combinations drawn from $p_1, \ldots, p_N$. Thus formally:

$$Z_k = \sum_{\substack{I \subset \{1,\ldots,N\} \\ |I|=k}} \bigcap_{i \in I} p_i, k \in \{0, \ldots, N\} \quad (4)$$

where the intersection over the empty set is defined as $\Omega$. Thus $Z_0 = 1$ and the sum runs over all subsets I of the indices $1, \ldots, N$ which contain exactly k elements. For example, if N=3, then $$Z_1 = p_1 + p_2 + p_3$$

$$Z_2 = p_1 p_2 + p_1 p_3 + p_2 p_3 \quad (5)$$

$$Z_3 = p_1 p_2 p_3$$

Then define P(n) in terms of $Z_k$ by normalizing for all redundantly counted set intersections using Waring's theorem [26], which is a special case of the Schuette-Nesbitt formula [27].

$$P(\Omega_n) = \sum_{k=n}^{N} \binom{k}{n} Z_k (-1)^{k-n}, k \in \{0, \ldots, N\}. \quad (6)$$

The inclusion-exclusion theorem is given by n=0. A scalable means of computing $Z_k$ is described in Algorithm 1.

---
Algorithm 1 Recursive Waring Algorithm
---

Input P = $\{p_n \in \mathbb{R}^m\}_{n=1}^N$ : a probability vector
Output: Calculate the values of $Z_k$ given an arbitrary vector of probabilities ---
Algorithm 1 Recursive Waring Algorithm
---

1  Construct an N × N upper triangular matrix $A^T = [a_{i,j}]$
2  $a_{1,*} \leftarrow P$
3  for i = 2 to N do
4      k ← 0
5      for j = i to N do
6          k ← k + $a_{i-1,j-1}$
7          $a_{i,j} \leftarrow ka_{1,j}$
8      end for
9      $Z_i \leftarrow \sum_{j=i}^{N} a_{i,j}$
10 end for The primary benefit of this approach is the exponentially rising discount in time complexity with increasing values of N. This arises from the dynamic programming character of the algorithm which groups calculations in blocks to minimize redundancy. This self-similar recursive structure makes calculation feasible by avoiding combinatorial explosion. Using this approach, the total number of blocks that need to be calculated increases with $N^2$ and is described by the arithmetic sum N/2*(1+N).

Another advantage of this approach is the ability to compute the elements of each column in parallel. This means that the time complexity decreases from $O(N^2)$ without parallelization to $O(N)$ with full parallelization implemented. Further improvement may be made by calculating matrix elements in the reverse direction, thereby providing a tandem method for parallel computation of matrix $A^T$. This is accomplished by using two recursive functions, $a_{i,N} = a_{1,N}(Z_{i-1} - a_{i-1,N})$ and $a_{i,j} = a_{i,j} \cdot (a_{i,j+1}/a_{1,j+1} - a_{i-1,j})$, simultaneously in addition to the recursive function defined in Algorithm 1. The methods described above provide an efficient means of generating joint probability mass functions (p.m.f.). The case for N=6 is demonstrated here with the $Z_k$ series being multiplied by the appropriate binomial coefficients.

$$\begin{pmatrix} \binom{0}{0} & -\binom{1}{1} & \binom{2}{2} & -\binom{3}{3} & \binom{4}{4} & -\binom{5}{5} & \binom{6}{6} \\ 0 & \binom{1}{0} & -\binom{2}{1} & \binom{3}{2} & -\binom{4}{3} & \binom{5}{4} & -\binom{6}{5} \\ 0 & 0 & \binom{2}{0} & -\binom{3}{1} & \binom{4}{2} & -\binom{5}{3} & \binom{6}{4} \\ 0 & 0 & 0 & \binom{3}{0} & -\binom{4}{1} & \binom{5}{2} & -\binom{6}{3} \\ 0 & 0 & 0 & 0 & \binom{4}{0} & -\binom{5}{1} & \binom{6}{2} \\ 0 & 0 & 0 & 0 & 0 & \binom{5}{0} & -\binom{6}{1} \\ 0 & 0 & 0 & 0 & 0 & 0 & \binom{6}{0} \end{pmatrix} \cdot \begin{pmatrix} Z_0 \\ Z_1 \\ Z_2 \\ Z_3 \\ Z_4 \\ Z_5 \\ Z_6 \end{pmatrix} = \begin{pmatrix} P(0) \\ P(1) \\ P(2) \\ P(3) \\ P(4) \\ P(5) \\ P(6) \end{pmatrix}$$

The same pmf may be generated using an alternative method described below.

The Fast Fourier Transform

Using the same definitions as before, the probability of any particular combination ω can be written as the combinatorial product of occurring and non-occurring events.

$$P(\omega) = \prod_{i \in I} p_i \prod_{i \in I^C} (1 - p_i) \quad (7)$$

If $\Omega_n$ is defined to be the corresponding sample space of all possible paired sets of I and $I^C$ resulting from n occurrences and N-n non-occurrences, then $$P(\Omega_n) = \sum_{j=1}^{\binom{N}{n}} \prod_{i \in I_j} p_i \prod_{i \in I_j^C} (1 - p_i) \quad (8)$$

The above expression is intuitive as it is the summed probabilities of all possible combinations of occurrences and non-occurrences. By observation, it is possible to construct a polynomial to express $P(\Omega_n)$ as coefficients of an N-order polynomial.

$$\prod_{i=1}^{N} [p_i x + (1 - p_i)] = \sum_{n=0}^{N} P(\Omega_n) x^n \quad (9)$$

The coefficients for the above polynomial may then by easily solved using algorithms based on the Discrete Fourier Transform. The relevant coefficient vector may be efficiently calculated as follows:

$$C(x) = IFFT\left(\prod_{k=1}^{N} FFT(\, p_k \quad 1 - p_k \,)\right) \quad (10)$$

Practically speaking, the vectors may be padded with leading zeros to a power of two length and then iteratively processed in pairs using $IFFT^{-1}(FFT(a) \cdot FFT(b))$ where a and b represent any arbitrary pair of vectors. Using a GPU-implementation of the Fast Fourier Transform (FFT), multiple inputs can be processed in parallel using a simple scheme of interleaved inputs and de-convoluted outputs. This function returns a list of tuples, where the $i^{th}$ tuple contains the $i^{th}$ element from each of the argument sequences or iterables.

DNA Sequencing.

Figure 1B:
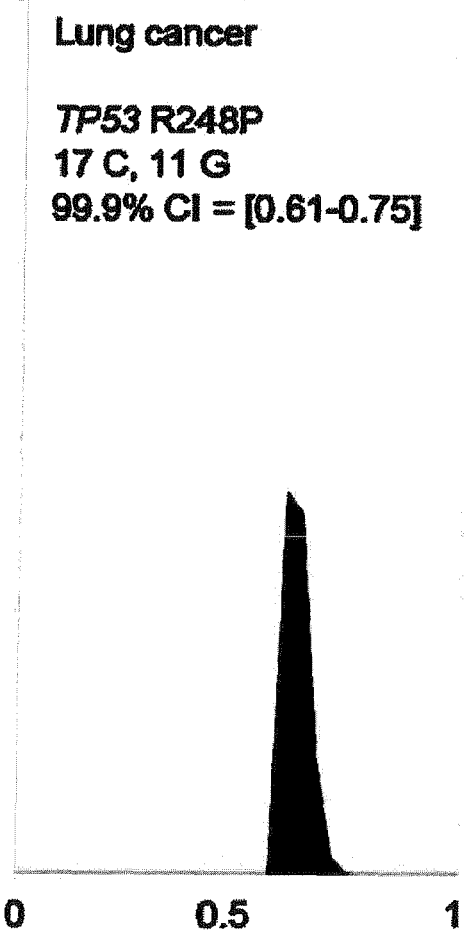

One important application of the present invention is the analysis of next-generation DNA sequencing datasets where thousands of reads have to be analyzed per DNA base position. If a particular base position is mutated in cancer, then detection of such variants would be an ideal diagnostic. In reality, variant DNA is often admixed with normal DNA in low proportions and the challenge is to calculate statistical confidence given two conflicting states detected at the same base position. This may be accomplished by treating these conflicting states as Bernoulli events and constructing p.m.f.s using either of the two methods described above. Example output is illustrated in FIGS. 1a and 1b.

Confidence intervals calculated from these p.m.f.s then allow a decision as to whether evidence for the variant base state is sufficiently above a threshold of significance. According to aspects of the present invention, similar principles can be applied to pattern recognition applications, especially those pertaining to image analysis. This can be supported by the fact that pixel intensity can only be considered as a random variable and it does not have a true value, since it is governed by the laws of quantum physics [28].

Poisson-Binomial Radius Semimetric Distance

Calculating confidence intervals for every pairwise distance comparison would be computationally intensive in a large image dataset. To avoid this cost and improve efficiency, a distance measure can be defined for independent but non-identically distributed feature descriptors as follows:

Definition. Given two N dimensional feature vectors $X=(a_1, a_2, a_3, \ldots, a_N)$ and $Y=(b_1, b_2, b_3, \ldots, b_N)$ with $p_i = |a_i - b_i|$, the distance between the two vectors is $$PB_m(X,Y) = P(\Omega_m)(N-m) \quad (11)$$

where m is the mode and P(m) is the peak probability of the distribution. Darroch [29] has previously shown that mode m may be bounded as follows:

$$m = \begin{cases} n, & \text{if } n \le \mu \le n + \dfrac{1}{n+2} \\ n \text{ and/or } n+1, & \text{if } n + \dfrac{1}{n+2} \le \mu \le n + 1 - \dfrac{1}{N-n+1} \\ n+1, & \text{if } n + 1 - \dfrac{1}{N-n+1} < \mu \le n+1 \end{cases}$$

where $0 \le n \le N$. This implies that m differs from the mean $\mu$ by less than 1. Thus, although the mode m is a local maximum, it is approximated by the mean $\mu$. This allows $$PB_\mu(X,Y) = P(\Omega_\mu)(N-\mu) \quad (12)$$

A further refinement may be made by considering the excess kurtosis of the Poisson-Binomial distribution which is given by $$Kurt\left[\sum_{n=0}^{N} P(\Omega_n)\right] = \frac{1}{\sigma^2} - 6 \quad (13)$$

where $\sigma^2$ is the variance of the p.m.f. The inverse relationship between the peakness of the distribution with $\sigma^2$ implies a similar relationship between $P(\Omega_\mu)$ and $\sigma$. This inverse relationship is also consistent with the work of Baillon et al [30] which established the following sharp uniform upper bound for sums of Bernoulli trials.

$$P(\Omega_n) \le \frac{\eta}{\sigma} \quad (14)$$

where $\eta$ is the upper bound constant. The implication of this inverse relationship is that $\sigma$ can be adopted as a surrogate measure of $P(\Omega_\mu)$, thereby avoiding the need to generate a p.m.f. for each distance calculation. Thus, the following semi-metric for independent and non-identical feature descriptors can be defined.

Given two N dimensional feature vectors $X=(a_1, a_2, a_3, \ldots, a_N)$ and $Y=(b_1, b_2, b_3, \ldots, b_N)$ with $p_i = |a_i - b_i|$, the Poisson-Binomial Radius distance between the two vectors is $$PBR(X, Y) = \frac{\sigma}{N-\mu} = \frac{\sqrt{\sum_{i=1}^{N} p_i(1-p_i)}}{N - \sum_{i=1}^{N} p_i} \quad (15)$$

PBR(X, Y) is a semi-metric. A function d: X×X→[0, 1] is semi-metric over a set X if it satisfies the following properties for {x, y} X: (1) Non-negativity, d(x,y)>=0; (2) Symmetry property, d(x,y)=d(y,x); and 3) Reflexivity, d(x,x)=0. PBR is a nonnegative function and satisfies the reflexivity property. Because only absolute values are used, PBR also satisfies the symmetry property. See Table 4 below showing that PBR and $PB_\mu$ are equivalent distance measures for practical purposes.

Image Classification Application

Image classification is a computer automated process of assigning a digital image to a designated class based on an analysis of the digital content of the image (e.g., analysis of pixel data). The most common use of such processes is in image retrieval, or more specifically, content-based image retrieval (CBIR). CBIR is the process of retrieving closely matched or similar images from one or more digital image repositories based on automatically extracted features from the query image. It has found numerous practical and useful applications in medical diagnosis, intellectual property, criminal investigation, remote sensing systems and picture archiving and management systems. See [31].

The key objectives in any CBIR system are high retrieval accuracy and low computational complexity (the present invention improves both). Implementing an image classification step prior to image retrieval can increase retrieval accuracy. Moreover, the computational complexity can also be reduced by this step.

Let $N_T$ be the number of training images per class, $N_C$ the number of classes and $N_D$ the number of feature descriptors per image. The computational complexity of a typical CBIR system is $O(N_T \cdot N_C \cdot N_D + (N_T \cdot N_C) \cdot \log(N_T \cdot N_C))$. See [34]. In contrast adding a pre-classification step decreases complexity to $O(N_C \cdot N_D \cdot \log(N_T \cdot N_D)) + O(N_T \cdot N_D + N_T \cdot \log(N_T))$. The first term refers to image pre-classification using a Naive-Bayes nearest neighbor classifier [35] and the second term refers to the CBIR process itself.

To give some perspective, consider the case of $N_T$=100, $N_C$=10 and $N_D$=150. The computational complexity of the latter compared to the former results in an increase in processing speed of 7 times. Thus, image pre-classification improves CBIR performance.

The detection of cat heads and faces have attracted the recent interest of researchers, reflecting their popularity on the internet and as human companions [36], [37], [38], [39]. Cats present interesting challenges to pattern recognition. Although, sharing a similar face geometry to humans, approaches for detecting human faces can't be directly applied to cats because of the high intra-class variation among the facial features and textures of cats as compared to humans. The present invention is a PBR-based classifier that can distinguish between the two.

Figure 2A:
FIGS. 2a and 2b are example images from the (a) LFW dataset and (b) cat dataset, respectively.
Figure 2B:

The Labelled Faces in the Wild (LFW) image dataset (FIG. 2a) was created by the authors of [40], and the cat dataset (FIG. 2b) was created by the authors of [36]. These consist of 13,233 human images and 9,997 cat images. In an example, within each class, 70% of the images were randomly partitioned for training and the remaining 30% for testing.

Figure 3A:
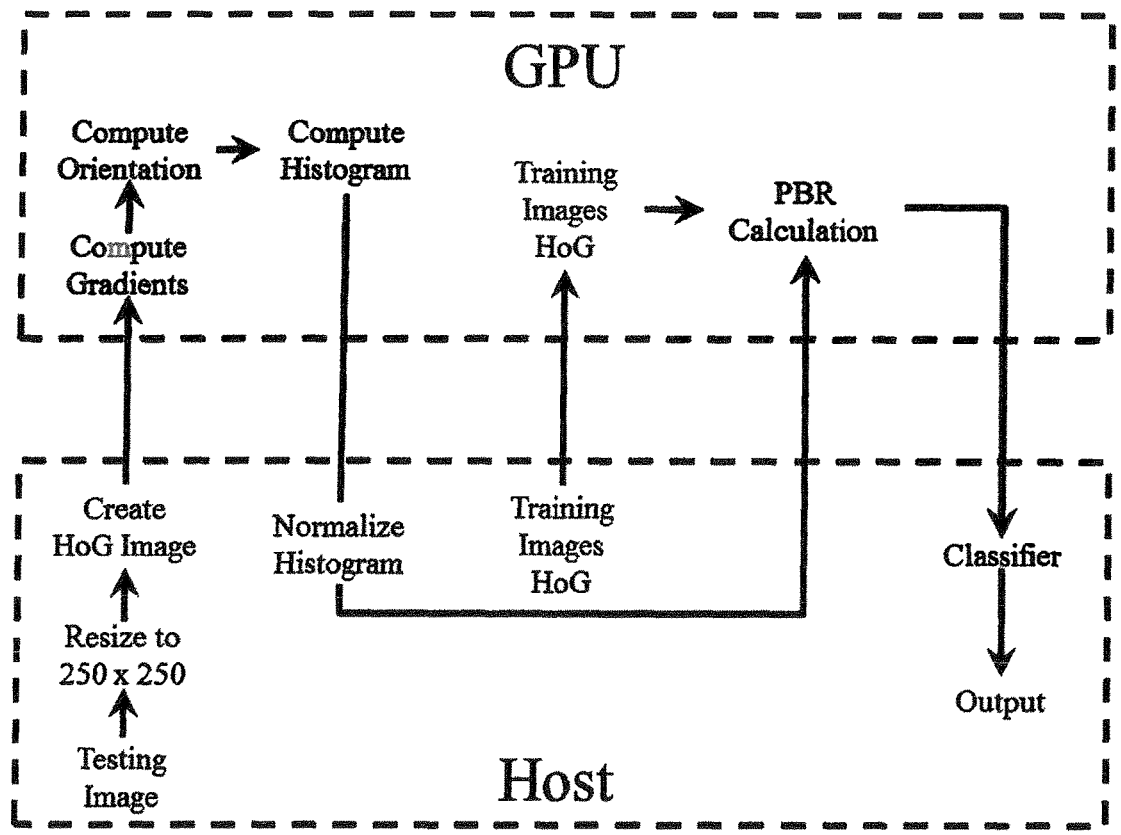
FIG. 3a is a block diagram of exemplary implementation architecture for image recognition according to an embodiment of the present invention.
Figure 3B:
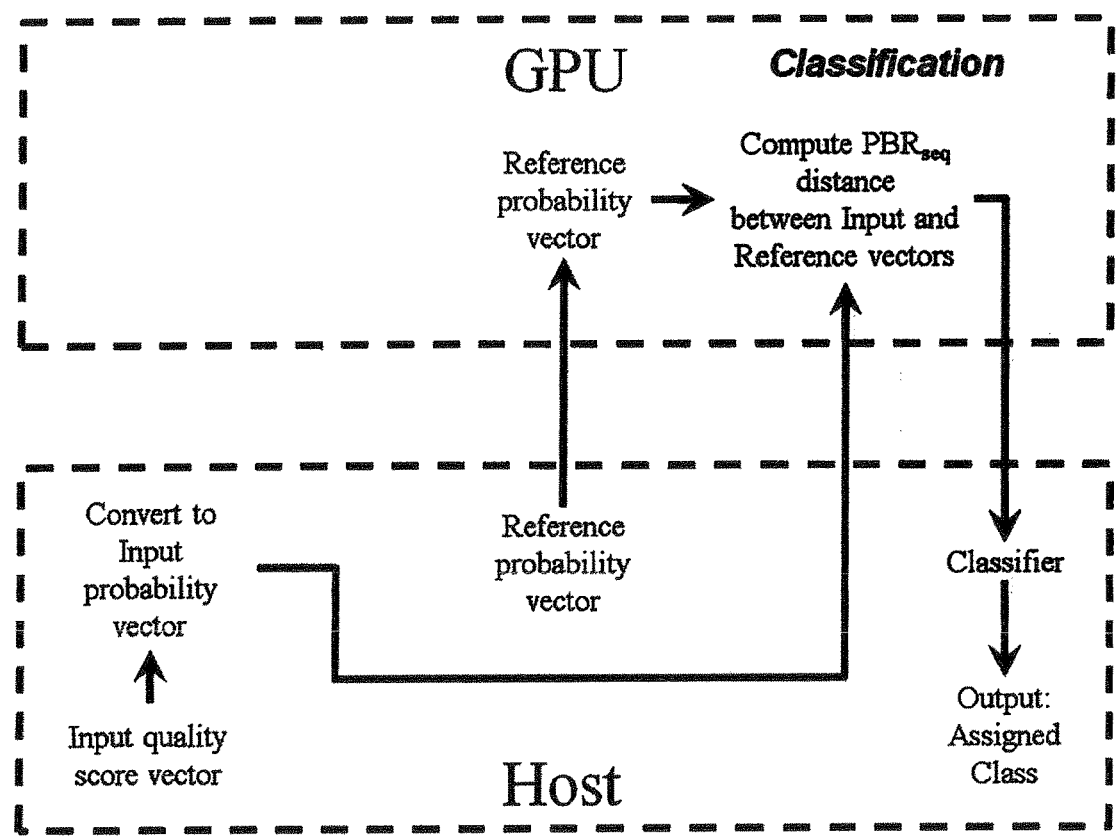
FIG. 3b is a block diagram of exemplary implementation architecture for DNA rare variant detection according to an embodiment of the present invention.
Figure 3C:
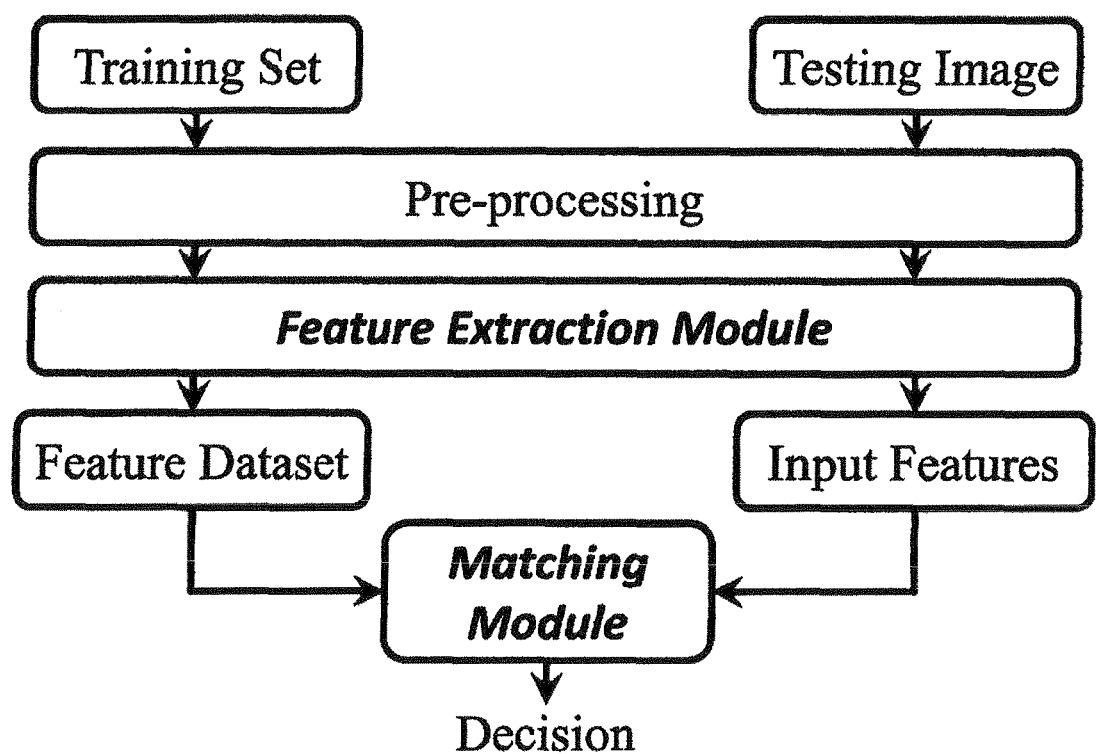
FIG. 3c is a basic flow chart for performing image recognition according to embodiments of the present invention.

According to aspects of the present invention, an image classification system is shown in FIG. 3a that is capable of performing image classification as described herein (see, also, basic process shown in FIG. 3c). As shown, the system includes a graphics processor coupled with a host computing system (e.g., CPU), that has access to memory (not shown). As shown in FIG. 3a, the Host is capable of accessing stored images or image data for training images. As described below, each image is resized to a standard size (e.g., 250× 250 pixels) which can be selected based on the particular application. After resizing, the Histogram of Oriented Gradients (HOG) is used for feature extraction. The HOG data may be stored and accessed for each training image so that it need not be created (or recreated) on the fly. The image to be classified (on FIG. 3a, the test image) is received at the Host from an image source such as memory, a network, or an image capture system (camera, scanner, or other imaging device). The image is resized to the standard size. After resizing, the Histogram of Oriented Gradients (HOG) is used for feature extraction.

The HOG data is input into the GPU for further processing. Orientation is computed and a histogram created. The histogram is normalized (as shown, by the Host). PBR calculation is performed on both the training image data and the test image data. Of course, the PBR calculation may be performed ahead of time for the training images and the results stored. Finally, comparisons are made to classify the image by finding the closest match using the PBR results. For example, algorithm 2 (below) may be employed.

In one example, a GPU-parallelized version of Histogram of Oriented Gradients (HOG) [41] was used for feature extraction. A classifier called adaptive local mean-based k-nearest neighbor (ALMKNN) is used, which is a modification of a local mean-based nonparametric classifier used in Mitani et al [42]. ALMKNN is partially implemented on the GPU.

HOG features may be GPU-implemented using NVIDIAs Compute Unified Device Architecture (CUDA) framework. HOG features were first described by Navneet Dalai and Bill Triggs [41] as a means of abstracting appearance and shape by representing the spatial distribution of gradients in an image. This has been applied in pedestrian detection [43], vehicle detection [44] and gesture recognition [45]. According to one embodiment, the rectangular-HOG (R-HOG) variant [46] is used as described below.

According to another aspect of the present invention, a system and method for DNA sequencing, such as rare variant detection, for example, in the case of a tumor biopsy, may be provided. A vector X of sequencing quality probabilities is from an input DNA sample at a single base position with sequencing depth $d_x$ such that $X=(x_1, x_2, x_3, \ldots, x_{dx})$, and a similar vector Y from a reference DNA sample sequenced to depth $d_y$ such that $Y=(y_1, y_2, y_3, \ldots, y_{dy})$. Calculate the means ($\mu$) and standard deviations ($\sigma$) for both vectors as follows $$\mu_Y = \frac{1}{d_y}\sum_{i=1}^{d_y} y_i \qquad \mu_X = \frac{1}{d_x}\sum_{i=1}^{d_x} x_i$$

$$\sigma_Y = \sqrt{\sum_{i=1}^{d_y}(1-y_i)y_i} \qquad \sigma_X = \sqrt{\sum_{i=1}^{d_x}(1-x_i)x_i}$$

To compare vectors X and Y, $PBR_{seq}$ can be defined to be the distance between X and Y as follows:

$$PBR_{seq}(X, Y) = \frac{\sigma_X \sigma_Y}{|\mu_X - \mu_Y|}$$

A small $PBR_{seq}$ value indicates a greater likelihood of a tumor sample. For the purposes of classification, a simple threshold T can be defined such that sample X is classified as a tumor if $PBR_{seq} \leq T$ but otherwise classified normal.

As shown in FIG. 3b, a system for DNA sequencing is provided. As shown in FIG. 3b, the system is similar to the system of 3a, but implements the above method for DNA sequencing using vector data. As shown, the input quality score vector as described above is converted to an input probability vector, which can be accomplished by the host. Reference probability vectors can be provided ahead of time or calculated by the host and provided to the GPU. The GPU is configured to receive the two probability vectors and to compute the $PBR_{seq}$ distance between the input and reference vectors. The distance is used to classify the DNA sequence and the host outputs an indication of the assigned class.

Gradient Computation.

Given an input image 1(x, y), 1-D spatial derivatives $I_x(x, y)$ and $I_y(x, y)$ may be computed by applying gradient filters in x and y directions. The gradient magnitude Mag(x, y) and orientation (x, y) for each pixel may be calculated using:

$$\text{Mag}(x,y) = \sqrt{I_x(x,y)^2 + I_y(x,y)^2} \quad (16)$$

$$\theta(x,y) = \tan^{-1}(I_y(x,y)/I_x(x,y)) \quad (17)$$

Histogram Accumulation.

The histograms may be generated by accumulating the gradient magnitude of each pixel into the corresponding orientation bins over local spatial regions called cells. In order to reduce the effect of illumination and contrast, the histograms are normalized across the entire image. Finally, the HOG descriptor is formed by concatenating the normalized histograms of all cells into a single vector.

In one example, the HOG algorithm described above was implemented using the PyCUDA toolkit [47] version 2012.1 and version 5.0 of the NVIDIA CUDA Toolkit and executed on a GeForce GTX 560 Ti graphics card. Each image was resized to 250×250 (62,500 pixels) then subdivided equally into 25 cells, each 50×50 pixels. To address 62,500 pixels, 65,536 threads are created in the GPU having 32×32 threads per block and 8×8 blocks per grid. After allocating memory in both the host and GPU, the kernel is launched.

Gradient magnitudes, orientations and the histogram may be calculated after the histogram is transferred to the Host where normalization across the entire image is carried out.

Classification Module

Classifiers may be either parametric or non-parametric. Parametric classifiers assume a statistical distribution for each class which is generally the normal distribution. Training data is used only to construct the classification model and then completely discarded. Hence they are referred to as model-based classifiers or eager classifiers. In comparison, non-parametric classifiers make no assumption about the probability distribution of the data, classifying the testing tuple based only on stored training data and are therefore also known as instance-based or lazy classifiers. The prototypical example of a parametric classifier is the support vector machine (SVM) algorithm which requires an intensive training phase of the classifier parameters [48], [49], [50] and conversely, one of the most well-known non-parametric classifiers is the k-nearest neighbor (kNN) classifier.

kNN [51] has been widely used in pattern recognition problems due to its simplicity and effectiveness. Moreover, it is considered to be one of the top ten algorithms in data mining [52]. kNN assigns each query pattern a class associated with the majority class label of its k-nearest neighbors in the training set. In binary (two-class) classification problems, the value of k is usually an odd number to avoid tied votes. Even though kNN has several advantages such as the ability to handle a huge number of classes, avoidance of over fitting and the absence of a training phase, it suffers from three major drawbacks: (1) computational time, (2) the influence of outliers [53] and (3) the need to choose k [54].

The first problem, time complexity, arises during the computation of distances between the training set and query pattern, particularly when the size of the training set is very large. This problem can be addressed by parallelizing kNN, reducing time complexity to a constant O(1). This compares well to alternative implementations such as search trees which are O(log N) in time. The second problem involves the influence of outliers. To get around this problem, an approach focusing on local neighbors can be used. This type of approach, called LMKNN (Local Mean kNN) however, still carries the problem of having to choose a value for k. Most of the time, k is chosen by cross validation techniques [55].

This is, however, time consuming and carries the risk of over fitting. Thus, the present invention involves an algorithm where k is adaptively chosen, thus obviating the need for a fixed k value. To put an upper bound on k, the general rule of thumb is used, which is the square root of N, where N is the total training instances in T [56]. The algorithm is referenced as the Adaptive LMKNN or ALMKNN.

The workings of this classifier are described in Algorithm 2.

---

Algorithm 2 ALMKNN Algorithm

Input: Query pattern: x ; T = $\{x_n \in \mathbb{R}^m\}_{n-1}^N$ : a TS; $c_1, c_2, ...,$
   $c_M$: M class labels ; $k_{min}$: Minimum number of nearest neighbours;
   $k_{max}$: Maximum number
   of nearest neighbours; LB: Lower bound; UB: Upper bound
Output: Assign the class label of a query pattern to a nearest local mean vector among classes
1 Compute the distances between x to all $x_i$ belonging to T
2 Choose $k_{min}$ nearest neighbour in T, say $T_{kmin}(x)$
3 Determine the number of neighbours in $T_{kmin}(x)$ for each class $c_i$
4 if all the members in $T_{kmin}(x)$ represents only one class c then
5    Assign x to class c
6 else
7    while $k_{min} \leq k_{max}$ do
8      count ← 0
9      Calculate the local mean vector for each class $c_i$ in set $T_{kmin}(x)$
10     Calculate the distances $d_i$ between x and each local mean vector
11     Sort $d_i$ in ascending order to get $d_1 < d_2 < d_3 .... < d_M$
12     Calculate the percentage change between the nearest two distances
      $d_1$ and $d_2$
13     if percentage change > LB + ((UB − LB)/($k_{max} − k_{min}$)) then
14       Assign x to class $c[d_1]$
15       break while
16     else
17       $k_{min}$ ← $k_{min}$ + 1
18       count ← count + 1
19     end if
20    end while
21    else
22     Calculate local mean vector for each class $c_i$ in set $T_{kmin}(x)$
23     Calculate the distances $d_i$ between x and each local mean vector
24     Assign x to the class $c_i$ with a nearest local mean vector
25 end if

---

With 16,261 (N in T) training instances, the limits on neighbors, $k_{min}$ and $k_{max}$, may be defined as 20 and 127 (floor of $\sqrt{N}$) respectively. A lower bound (LB) and upper bound (UB) may be defined for decision-making to be 2% and 50% respectively. The first step of distance computation maybe implemented in GPU using CUDAMat [57]. The rest of the algorithm was implemented in CPU (Host). There is no training phase and HOG descriptors for the training images are stored in memory.

Classification Performance

Figure 4:
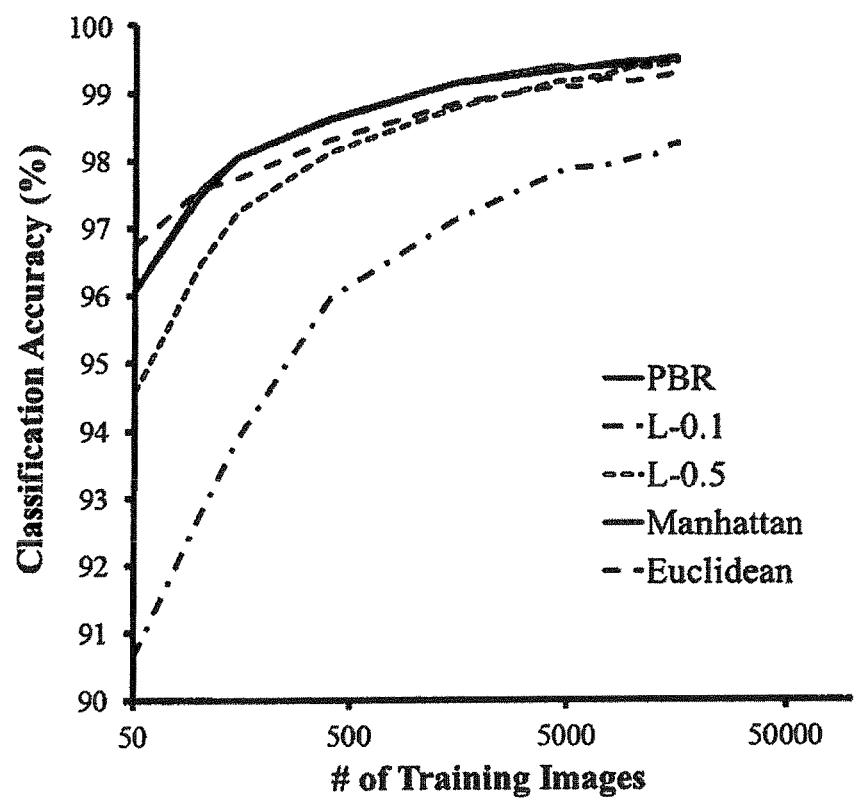
FIG. 4 is a graph of classification accuracy as a function of number of training images.

Using ALMKNN as the framework, the various distance measures were evaluated side-by-side, namely PBR, $L_{0.1}$, $L_{0.5}$, $L_1$ and $L_2$. Classification accuracy of the present invention was averaged over six runs of repeated random sub-sampling validation and these results are shown in FIG. 4. Interestingly, PBR and $L_1$ were nearly identical in accuracy, easily outperforming the other distance measures. Euclidean distance was able to perform marginally better with a small training set but quickly lost out as the number of training images increased.

Effect of Noise:

To test if PBR would be more resistant to noise degradation compared to other distance measures, both training and testing images were corrupted with salt and pepper noise of increasing density, d. At d=0, PBR significantly outperformed all distance measures except $L_1$. However, consistent with our hypothesis, PBR significantly outperformed all distance measures including $L_1$ when even a minimal amount of noise (d=0.05) was added (Table 1).

TABLE 1

A comparison of AUC achieved by the 5 methods.

| Noise level (d) | $L_{0.1}$ | $L_{0.5}$ | $L_1$ | $L_2$ | PBR |
|---|---|---|---|---|---|
| 0.00 | 0.9758* | 0.9899* | 0.9916 | 0.9892* | 0.9918 |
| 0.05 | 0.9061* | 0.9246* | 0.9295* | 0.9224* | 0.9336 |
| 0.25 | 0.8348* | 0.8543* | 0.8572* | 0.8443* | 0.8607 |
| 0.50 | 0.7938* | 0.8229* | 0.8326* | 0.8292* | 0.8364 |

The Area Under the Curve (AUC) for each method was averaged over 6 independent runs of repeated random sub-sampling validation. The Wilcoxon signed-rank test with 95% confidence level was used to compare other methods with PBR. Methods which performed significantly worse than PBR are highlighted with an asterisk *. The highest AUC for each noise level is bolded.

Computation Time

Computation time was measured on a 64-bit Intel Core i5-3470 CPU @ 3.20 GHz 12 GB RAM PC system running Ubuntu 12.04 LTS.

TABLE 2

Average computation time for processing a 250 x 250 pixel image.

|  | CPU (ms) | GPU (ms) | Speedup |
|---|---|---|---|
| Grab Image | 0.007 | — | — |
| HoG | 17.19 | 5.73 | 3 |
| PBR Calculation | 31.7 | 12.11 | 2.6 |
| Classifier | 1.37 | — | — |
| Total | 50.26 | 19.21 | 2.6 |

From Table 2, it can be seen that a GPU implementation of the present invention was roughly 2.6 times faster than a purely CPU version. This speed up brings PBR almost on par with $L_1$ and $L_2$. Computation time was further reduced by introducing the Nearest Mean Classifier (NMC) (Algorithm 3) as a step before the ALMKNN classifier. A confidence measure (CM) of 20% was used, meaning that the NMC result was used for classification when the contrast between distances to the centroids exceeded 20%.

Algorithm 3 The Nearest Centroid and ALMKNN Algorithm

Figure 5:
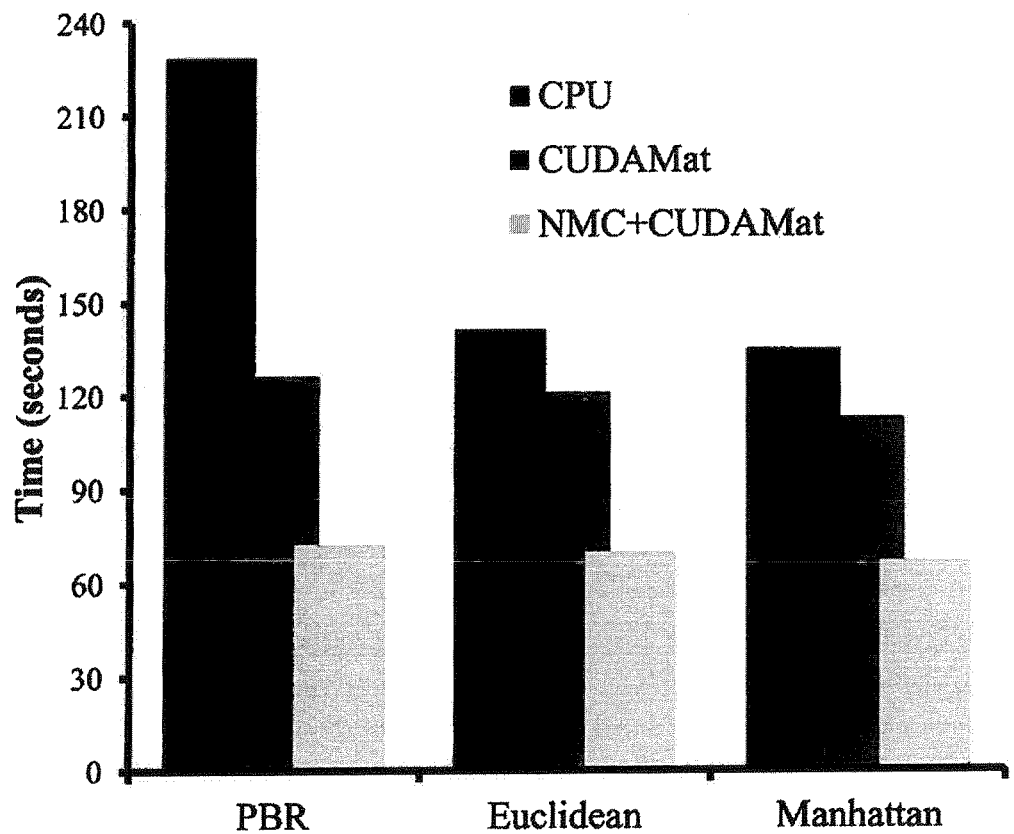
FIG. 5 is a bar graph of a comparison of computation time for the image classification application using different distance measures.

Input: Query pattern: x ; T = $\{x_n \in \mathbb{R}^m\}_{n=1}^N$ : a TS; $c_1$, $c_2$, ..., $c_M$: M class labels ; $k_{min}$: Minimum number of nearest neighbours;

$k_{max}$: Maximum number of nearest neighbours; LB: Lower bound; UB: Upper bound; CM: Confidence measure Output: Assign the class label of a query pattern to a nearest local mean vector among classes
1 Calculate the local mean vector for each class $c_i$ belonging to T
2 Calculate the distances $d_i$ between x and each local mean vector using normalised Manhattan distance measure
3 Sort $d_i$ in ascending order to get $d_1 < d_2 < d_3 ... < d_M$
4 Calculate the percentage change between the nearst two distances $d_1$ and $d_2$
5 if percentage change > CM then
6  Assign x to class $c[d_1]$
7 else
8  Assign x to class $c_i$ using ALMKNN classifier
9 end if Accuracy results were exactly the same but computation time was significantly improved, as shown in FIG. 5.

Ear Biometrics Application

Biometric technology deals with automated methods of verifying the identity of an individual using traits which may be physiological or behavioral. The field of automated biometrics has made significant advances over the last decade with face, fingerprints and iris biometrics having emerged as the most commonly implemented modalities. No single biometric modality is free of shortcomings. Face biometrics for example, has been extensively researched and but yet is prone to failure in sub-optimal conditions [58], [59].

While fingerprints are complex enough in theory to give a unique signature, in reality, fingerprint biometrics are not spoof-proof, since the system is vulnerable to attack by fake fingerprints made of gelatin, silicon and latex [60]. Iris biometrics has proven to be highly accurate and reliable but its performance deteriorates rapidly under poor lighting, target movement, aging, partial occlusion by eyelids and sensitivity to acquisition instance. This has motivated research into other traits which can overcome the problems of the more established biometrics. One of these new traits, ear biometrics has received increasing attention for a host of reasons.

1) Unlike faces and irises, ear shape is reasonably invariant over teenage and adult life. Any changes generally occur before the age of 8 and after 70 [61].
2) A controlled environment is not required for ear imaging because image context takes its reference from the side of face.
3) Ear biometrics is able to distinguish between genetically identical twins whereas face biometrics fails in this respect [62].
4) The ear has a more uniform distribution of color and less variability with facial expressions.

According to aspects of the present invention, an ear recognition system is provided based on HOG features and PBR, in accordance with the description above. Databases that have been used are IIT Delhi Ear Databases I and II [63]. There are 125 subjects and 493 images in IIT Delhi DB 1; 221 subjects and 793 images in IIT Delhi DB 2.

The testing image for each subject in both the databases was randomly picked and the remaining images were used for training.

Biometric Analysis Architecture

There are three main steps in an ear recognition system: (1) pre-processing (2) feature extraction and (3) template matching. Histogram equalization maybe used as a pre-processing step. Feature extraction may be as already described above. According to aspects of the present invention, a matching module may search for the closest match among the training images. The images in these databases were 50×180 pixels and were resized to 50×50 pixels.

Recognition Performance

Performance was evaluated using rank-one recognition accuracy. The recognition result was averaged over ten runs. The mean and standard deviation of rank-one recognition rate for all the distance measures are shown in Table 3.

TABLE 3

Rank-one recognition performance on IIT Delhi databases

|  | IIT Delhi I | IIT Delhi II |
|---|---|---|
| PBR | 92.9 ± 1.7 | 93.0 ± 1.2 |
| $L_{0.1}$ | 90.7 ± 2.4 | 90.3 ± 1.3 |
| $L_{0.5}$ | 92.7 ± 1.9 | 93.0 ± 1.1 |
| $L_1$ | 92.6 ± 1.7 | 92.9 ± 1.2 |
| $L_2$ | 89.3 ± 1.6 | 89.8 ± 1.5 |

Figure 6A:
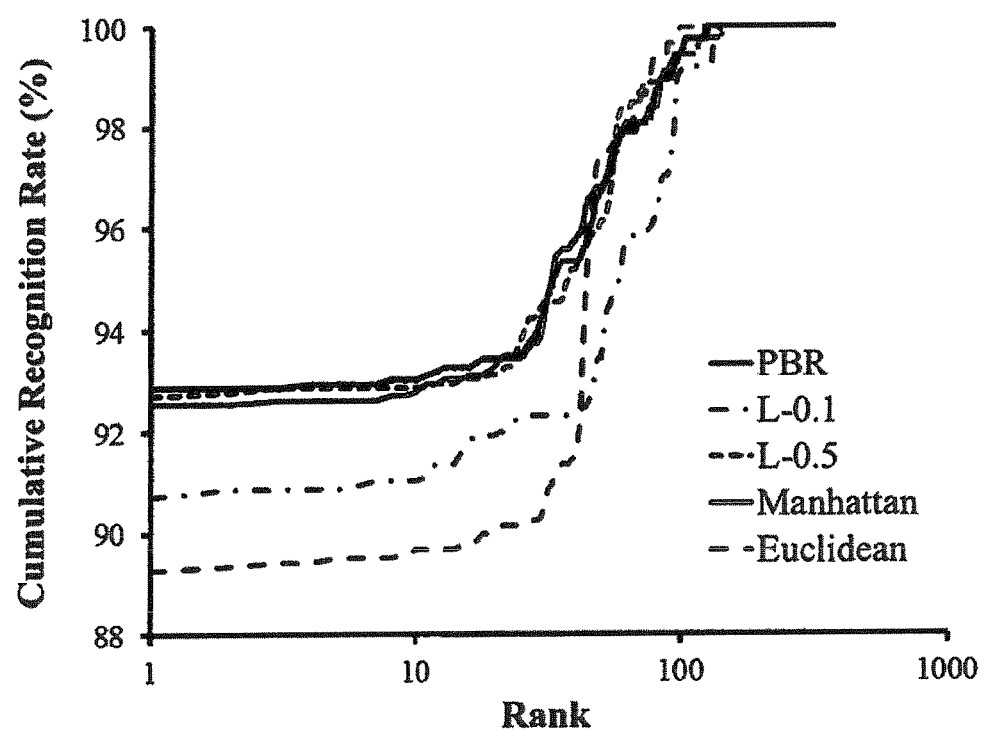
FIGS. 6a and 6b illustrate Cumulative Matching Curves (CMOs) for the (a) IIT Delhi I and (b) IIT Delhi II databases, respectively.
Figure 6B:
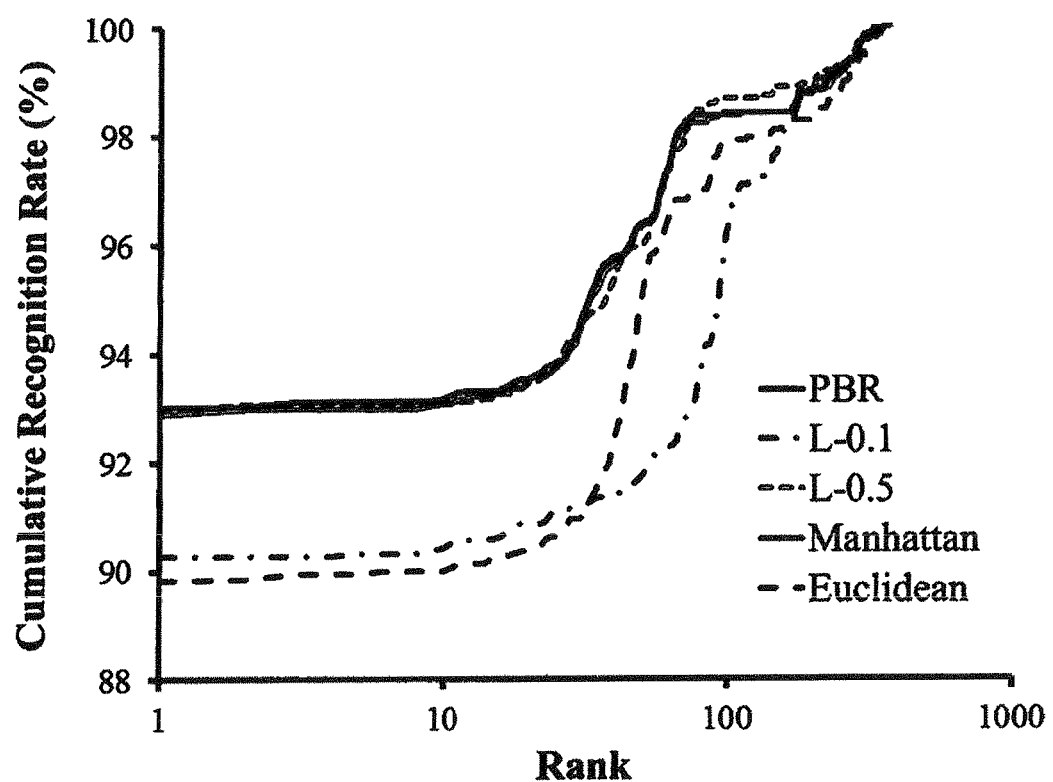

Cumulative Match Curves (CMCs) are used to measure performance for biometric recognition systems and have been shown to be directly related to the Receiver Operating Characteristic curve (ROC) in the context of performance verification[64]. Hence, also shown are the CMCs for all the measures in FIG. 6.

Figure 7A:
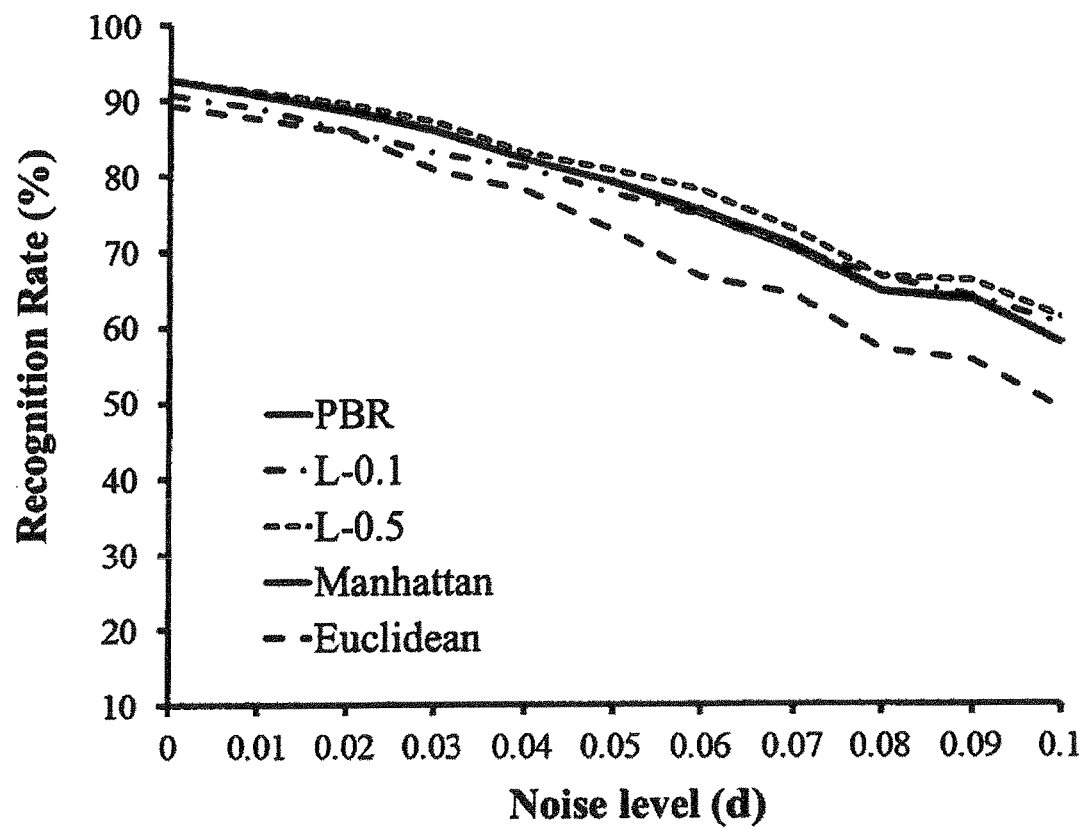
FIGS. 7a and 7b illustrate the effect of noise on rank-one recognition performance for the (a) IIT Delhi I and (b) IIT Delhi II databases, respectively.
Figure 7B:
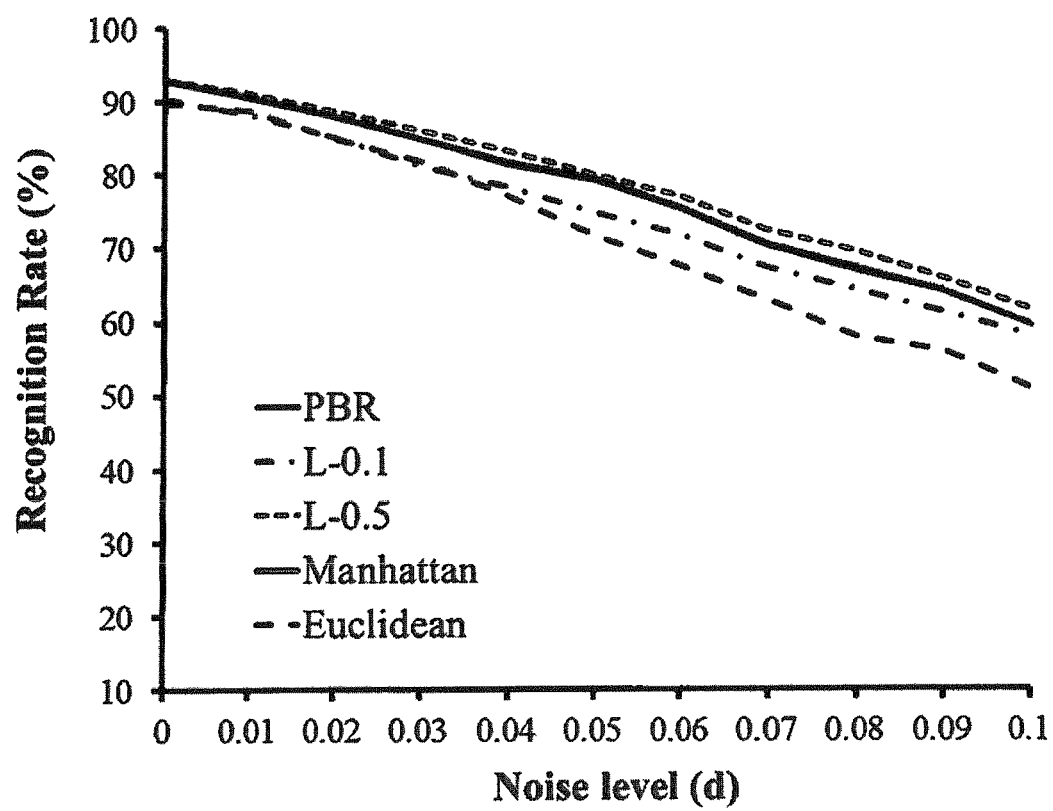

Effect of Noise:

In an experiment, the present invention was applied to training and test images that were corrupted with salt and pepper noise of increasing density, d. Comparisons are shown in FIGS. 7a and 7b. It can be seen that all distance measures except $L_2$ are stable over noise with $L_2$ performance degrading sharply with increasing noise density d.

Correlation Between PBµ and the Distance Measures:

Taking the rank ordering of images matched by the various distance measures to a defined test image, the correlation between PBµ and the other measures (i.e. PBR, $L_{0.1}$, $L_{0.5}$, $L_1$ and $L_2$) was taken. The results in Table 4 show that PBR and $PB_\mu$ are highly correlated and rank order is virtually identical between these two distance measures. This is consistent with $PB_\mu$ and PBR being approximately equivalent distance measures.

TABLE 4

Spearman rank correlation coefficient between $PB_\mu$ and other distance measures for one testing image

|  | $PB_\mu$ |
|---|---|
| PBR | 0.9995 |
| $L_{0.1}$ | 0.8452 |
| $L_{0.5}$ | 0.9887 |
| $L_1$ | 0.9889 |
| $L_2$ | 0.9738 |

Kernel-Based Image Classification

PBR is a distance metric accept different inputs (PRI-CoLBP, HOG) and also work within different machine learning frameworks (KNN, SVM kernel).

Although SVMs (Support Vector Machines) require input data to be independent and identically distributed, they are applied successfully in non-i.i.d scenarios such as speech recognition, system diagnosis etc. [65]. Hence, SVM framework may be employed to illustrate the efficiency of PBR distance in image classification. To incorporate PBR into the SVM framework, the following generalized form of RBF kernels is used [66]:

$$K_{d-RBF}(X,Y) = e^{-\rho d(X,Y)}$$

Where $\rho$ is a scaling parameter obtained using cross-validation and d(X, Y) is the distance between two histograms X and Y. Distance may be defined using a slightly modified form of PBR as follows:

Definition. Given two N dimensional feature vectors $X=(a_1, a_2, a_3, \ldots, a_N)$ and $Y=(b_1, b_2, b_3, \ldots, b_N)$ with $p_i = a_i \ln(2a_i/(a_i+b_i)) + b_i \ln(2 b_i/(a_i+b_i))$, the distance between the two vectors is:

$$d(X,Y) = \frac{\sum_{i=1}^{N} p_i(1-p_i)}{N - \sum_{i=1}^{N} p_i}.$$

The PBR kernel may be obtained by substituting d(X, Y) into the SVM framework.

Experiments

The performance of the PBR distance kernel was evaluated in the following six different applications: texture classification, scene classification, species, material, leaf, and object recognition. The texture data sets are Brodatz [67], KTH-TIPS [68], UMD [69] and Kylberg [70]. The scene classification application was based on the Scene-15 [71] data set. For recognition tasks, the Leeds Butterfly [72], FMD [73], Swedish Leaf [74] and Caltech-101 [75] data sets were employed. For both classification and recognition tasks, the dependence of performance on the number of training images per class was evaluated. In each data set, n training images were randomly selected, and the remaining for testing, except in the Caltech-101 data set where the number of test images was limited to 50 per class. All experiments were repeated a hundred times for texture data sets and ten times for others. For each run, the average accuracy per category was calculated. This result from the individual runs was used to report the mean and standard deviation as the final results. Only the grayscale intensity values for all data sets was used, even when color images were available.

Multi-class classification was done using the one-vs-the-rest technique. For each data set, the SVM hyper-parameters such as C and gamma was chosen by cross-validation in the training set with $$C \in [2^{-2}, 2^{18}]$$

and gamma $\in [2^{-4}, 2^{10}]$ (step size 2).

Recently, the Pairwise Rotation Invariant Co-occurrence Local Binary Pattern (PRICoLBP) feature has been shown to be efficient and effective in a variety of applications [76]. The significant attributes of this feature are rotational invariance and effective capture of spatial context co-occurrence information. Hence, this feature was used for experiments.

Texture Classification

The Brodatz album is a popular benchmark texture data set which contains 111 different texture classes. Each class comprises one image divided into nine non-overlapping sub-images.

The KTH-TIPS data set consists of 10 texture classes, with 81 images per class. These images demonstrate high intra-class variability since they are captured at nine scales under three different illumination directions and with three different poses.

The UMD texture data set contains 25 categories with 40 samples per class. These uncalibrated, unregistered images are captured under significant viewpoint and scale changes along with significant contrast differences.

The Kylberg data set has 28 texture classes of 160 unique samples per class. The classes are homogeneous in terms of scale, illumination and directionality. The 'without' rotated texture patches version of the data set were used.

The $2_a$ template configuration of PRICoLBP was used, which yielded 1,180 dimensional feature for all data sets. Experimental results are shown in Tables 5, 6, 7, and 8 for Brodatz, KTH-TIPS, UMD and Kylberg data sets respectively. From the results, we observe that PBR consistently outperforms other methods when the number of training images is low and yields smaller standard deviations when compared to other distance measures along with a higher classification rate.

TABLE 5

Texture Classification Results (Percent) on Brodat

| | Training images per class | |
|---|---|---|
| Methods | 2 | 3 |
| PBR | 95.9 ± 0.6 | 96.8 ± 0.5 |
| BD | 95.6 ± 0.9 | 96.6 ± 0.5 |
| JD | 95.7 ± 0.7 | 96.6 ± 0.6 |
| $\chi^2$ | 95.5 ± 1.0 | 96.6 ± 0.5 |
| $L_1$ | 93.1 ± 1.1 | 94.9 ± 0.8 |
| $L_2$ | 89.2 ± 1.4 | 92.3 ± 1.0 |
| $L_{0.5}$ | 92.9 ± 0.8 | 94.4 ± 0.8 |
| $L_1$-BRD | 93.1 ± 1.1 | 95.0 ± 0.9 |
| HI | 93.1 ± 1.0 | 95.0 ± 0.8 |
| Hellinger | 94.2 ± 0.9 | 95.8 ± 0.6 |

TABLE 6

TEXTURE CLASSIFICATION Results (Persent) on KTH-TIPS

| | Training images per class | | | |
|---|---|---|---|---|
| Methods | 10 | 20 | 30 | 40 |
| PBR | 87.7 ± 2.1 | 94.3 ± 1.6 | 97.3 ± 1.2 | 98.4 ± 1.0 |
| BD | 87.2 ± 2.4 | 94.1 ± 1.8 | 97.2 ± 1.2 | 98.3 ± 1.0 |
| JD | 87.1 ± 2.5 | 94.1 ± 1.8 | 97.1 ± 1.2 | 98.4 ± 1.0 |
| $\chi^2$ | 86.5 ± 2.6 | 94.0 ± 1.9 | 97.1 ± 1.1 | 98.5 ± 1.1 |
| $L_1$ | 83.3 ± 2.7 | 92.3 ± 2.0 | 95.9 ± 1.3 | 97.6 ± 1.1 |
| $L_2$ | 79.9 ± 2.8 | 89.9 ± 2.1 | 94.4 ± 1.5 | 96.5 ± 1.2 |
| $L_{0.5}$ | 74.9 ± 3.0 | 80.6 ± 2.1 | 83.6 ± 2.0 | 84.4 ± 1.7 |
| $L_1$-BRD | 83.4 ± 2.7 | 92.3 ± 2.0 | 95.9 ± 1.3 | 97.6 ± 1.1 |
| HI | 83.7 ± 2.9 | 92.4 ± 1.9 | 95.8 ± 1.2 | 97.5 ± 1.2 |
| Hellinger | 84.6 ± 2.8 | 92.8 ± 1.9 | 96.3 ± 1.2 | 97.8 ± 1.1 |

TABLE 7

TEXTURE CLASSIFICATION Results (Persent) on UMD

| | Training images per class | | | |
|---|---|---|---|---|
| Methods | 5 | 10 | 15 | 20 |
| PBR | 90.4 ± 2.0 | 95.6 ± 1.2 | 97.4 ± 0.9 | 98.4 ± 0.8 |
| BD | 90.1 ± 2.4 | 95.2 ± 1.2 | 97.1 ± 1.0 | 98.3 ± 0.7 |

TABLE 7-continued

TEXTURE CLASSIFICATION Results (Persent) on UMD

| | Training images per class | | | |
|---|---|---|---|---|
| Methods | 5 | 10 | 15 | 20 |
| JD | 90.0 ± 2.3 | 95.5 ± 1.4 | 97.3 ± 1.0 | 98.3 ± 0.8 |
| $\chi^2$ | 89.8 ± 2.5 | 95.5 ± 1.4 | 97.3 ± 1.0 | 98.3 ± 0.8 |
| $L_1$ | 86.7 ± 2.6 | 93.5 ± 1.5 | 95.8 ± 1.0 | 97.1 ± 0.9 |
| $L_2$ | 80.3 ± 2.5 | 89.7 ± 1.5 | 93.1 ± 1.3 | 95.0 ± 1.2 |
| $L_{0.5}$ | 84.9 ± 1.7 | 90.7 ± 1.3 | 92.8 ± 1.2 | 94.3 ± 1.1 |
| $L_1$-BRD | 86.7 ± 2.5 | 93.5 ± 1.5 | 95.8 ± 1.0 | 97.1 ± 0.9 |
| HI | 86.6 ± 2.6 | 93.4 ± 1.5 | 95.8 ± 1.0 | 97.0 ± 0.9 |
| Hellinger | 86.9 ± 2.4 | 93.3 ± 1.5 | 95.7 ± 1.1 | 97.0 ± 1.0 |

TABLE 8

TEXTURE CLASSIFICATION Results (Persent) on Kylberg

| | Training images per class | | | |
|---|---|---|---|---|
| Methods | 2 | 3 | 4 | 5 |
| PBR | 85.0 ± 2.8 | 90.7 ± 1.9 | 93.6 ± 1.7 | 95.8 ± 1.2 |
| BD | 83.9 ± 3.6 | 89.8 ± 2.5 | 93.1 ± 2.1 | 95.5 ± 1.5 |
| JD | 83.9 ± 2.6 | 89.8 ± 2.7 | 93.1 ± 1.9 | 95.5 ± 1.4 |
| $\chi^2$ | 83.1 ± 3.3 | 89.6 ± 2.4 | 92.5 ± 2.4 | 95.0 ± 1.6 |
| $L_1$ | 78.5 ± 2.8 | 84.1 ± 2.8 | 88.2 ± 2.1 | 90.4 ± 1.8 |
| $L_2$ | 73.6 ± 3.1 | 79.8 ± 3.0 | 83.9 ± 2.8 | 87.4 ± 2.3 |
| $L_{0.5}$ | 76.3 ± 4.6 | 82.9 ± 2.0 | 85.9 ± 1.9 | 88.3 ± 1.5 |
| $L_1$-BRD | 78.5 ± 2.8 | 84.1 ± 2.8 | 88.1 ± 2.1 | 90.4 ± 1.8 |
| HI | 78.5 ± 2.4 | 84.4 ± 2.4 | 88.0 ± 2.1 | 90.4 ± 1.8 |
| Hellinger | 80.5 ± 2.5 | 86.0 ± 2.0 | 89.2 ± 1.9 | 91.2 ± 1.7 |

Leaf Recognition

The Swedish leaf data set contains 15 different Swedish tree species, with 75 images per species. These images exhibit high inter-class similarity and high intra-class geometric and photometric variations. We used the same PRICoLBP configuration as for the texture data sets. It should be noted that we did not use the spatial layout prior information of leaves. Experimental results are shown in Table 9. We observe that PBR yields more accurate results than other distance measures.

TABLE 9

Recognition Results (Percent) on Swedish Leaf Data Set

| | Training images per class | | |
|---|---|---|---|
| Methods | 5 | 10 | 25 |
| PBR | 95.7 ± 1.0 | 97.7 ± 0.7 | 99.7 ± 0.2 |
| BD | 94.5 ± 1.7 | 97.2 ± 1.1 | 99.6 ± 0.3 |
| JD | 93.9 ± 1.9 | 97.2 ± 0.7 | 99.6 ± 0.3 |
| $\chi^2$ | 94.0 ± 1.9 | 97.2 ± 0.9 | 99.6 ± 0.3 |
| $L_1$ | 92.2 ± 1.5 | 95.8 ± 1.2 | 98.8 ± 0.6 |
| $L_2$ | 85.8 ± 3.5 | 91.7 ± 1.8 | 97.2 ± 0.9 |
| $L_{0.5}$ | 88.7 ± 1.5 | 92.2 ± 1.0 | 94.8 ± 0.6 |
| $L_1$-BRD | 92.2 ± 1.5 | 95.8 ± 1.2 | 98.8 ± 0.6 |
| HI | 91.6 ± 1.6 | 95.6 ± 1.3 | 98.8 ± 0.6 |
| Hellinger | 93.3 ± 1.4 | 96.7 ± 0.9 | 99.2 ± 0.5 |

Material Recognition

The Flickr Material Database (FMD) is a recently published challenging benchmark data set for material recognition. The images in this database are manually selected from Flickr photos and each image belongs to either one of 10 common material categories, including fabric, foliage, glass, leather, metal, paper, plastic, stone, water, and wood. Each category includes 100 images (50 close-up views and 50 object-level views) which captures the appearance variation of real-world materials. Hence these images have large intra-class variations and different illumination conditions. In effect, they are associated with segmentation masks which describe the location of the object. These masks may be used to extract PRICoLBP only from the object regions. Specifically, the 6-template configuration may be used for PRI-CoLBP, which yielded a 3,540 dimensional feature vector.

Table 10 shows the dependence of recognition rates on the number of training images per class of the FMD data set. It was observed that the PBR kernel performs best followed by Bhattacharyya distance and Jeffrey divergence.

TABLE 10

Experimental Results (Percent) on FMD Data Set

| Methods | Training images per class | | | | | |
|---|---|---|---|---|---|---|
| | 5 | 10 | 20 | 30 | 40 | 50 |
| PBR | 30.3 ± 3.9 | 39.8 ± 2.1 | 47.4 ± 1.8 | 51.5 ± 1.5 | 55.8 ± 1.7 | 57.3 ± 2.2 |
| BD | 28.6 ± 5.7 | 38.5 ± 2.2 | 46.7 ± 1.8 | 50.6 ± 2.0 | 54.7 ± 1.6 | 57.1 ± 2.1 |
| JD | 27.3 ± 3.9 | 38.6 ± 2.2 | 46.6 ± 2.0 | 51.0 ± 2.4 | 55.4 ± 1.9 | 57.0 ± 2.0 |
| $\chi^2$ | 27.4 ± 4.2 | 38.0 ± 1.7 | 45.9 ± 2.0 | 50.2 ± 2.4 | 54.5 ± 1.4 | 56.4 ± 1.8 |
| $L_1$ | 25.3 ± 4.9 | 35.1 ± 1.7 | 41.3 ± 2.1 | 43.6 ± 2.0 | 47.5 ± 1.6 | 51.3 ± 1.9 |
| $L_2$ | 22.0 ± 3.4 | 28.2 ± 2.9 | 34.3 ± 1.2 | 36.6 ± 1.0 | 39.9 ± 1.4 | 42.5 ± 2.2 |
| $L_{0.5}$ | 16.3 ± 2.4 | 18.2 ± 1.4 | 21.3 ± 1.3 | 21.3 ± 1.4 | 23.9 ± 1.3 | 23.9 ± 1.8 |
| $L_1$-BRD | 25.1 ± 4.9 | 34.5 ± 2.3 | 41.1 ± 2.4 | 43.6 ± 2.0 | 47.5 ± 1.6 | 51.2 ± 1.9 |
| HI | 27.1 ± 4.1 | 35.0 ± 2.0 | 42.0 ± 1.4 | 44.3 ± 2.0 | 47.8 ± 1.7 | 51.3 ± 1.7 |
| Hellinger | 28.5 ± 3.4 | 35.7 ± 1.8 | 42.4 ± 1.1 | 44.5 ± 2.0 | 49.2 ± 1.3 | 51.9 ± 1.6 |

Note that in Table 11, PBR kernel is the top performer in 5 categories out of all 10 categories, compared to other distance measure kernels.

TABLE 11

Category-Wise Accuracy (Percent) on FMD Data Set

| Category | PBR | BD | JD | $\chi^2$ | HI |
|---|---|---|---|---|---|
| Fabric | 46.6 | 47.0 | 46.6 | 46.2 | 39.2 |
| Foliage | 86.2 | 85.2 | 84.2 | 83.0 | 78.2 |
| Glass | 59.2 | 59.4 | 61.0 | 58.6 | 42.8 |
| Leather | 52.2 | 52.8 | 52.6 | 50.8 | 54.8 |
| Metal | 28.6 | 28.0 | 29.2 | 30.2 | 24.2 |
| Paper | 47.6 | 45.4 | 46.6 | 46.2 | 46.6 |
| Plastic | 52.8 | 51.8 | 50.6 | 49.8 | 48.4 |
| Stone | 69.2 | 71.2 | 68.8 | 70.2 | 63.0 |
| Water | 70.0 | 69.8 | 69.8 | 69.6 | 61.2 |
| Wood | 61.0 | 60.8 | 60.4 | 59.6 | 54.2 |

Scene Classification

The Scene-15 data set contains a total of 4,485 images which is a combination of several earlier data sets [71],[77], [78]. Each image in this data set belongs to one of 15 categories, including bedroom, suburb, industrial, kitchen, living room, coast, forest, highway, inside city, mountain, open country, street, tall building, office, and store. The number of images per category varies from 210 to 410. These images are of different resolutions, hence we resized the images to have the minimum dimension of 256 pixels (while maintaining the aspect ratio).

We used $2_a$ template configuration of the PRICoLBP but with two scales (radius of neighbors: 1,2). Hence the dimensionality of the feature vector is 2,360. Table 12 shows the clasification results of the different methods for varying number of training images. We observe that PBR works best with a lower number of training images and yields comparable performance with 100 training images per class.

TABLE 12

Classification Results (Percent) on Scene-15 Data Set

| Methods | Training images per class | | | |
|---|---|---|---|---|
| | 10 | 20 | 30 | 100 |
| PBR | 62.4 ± 1.9 | 69.6 ± 1.4 | 72.4 ± 1.0 | 79.7 ± 0.5 |
| BD | 61.3 ± 2.0 | 69.1 ± 1.5 | 72.0 ± 1.1 | 79.9 ± 0.4 |
| JD | 61.4 ± 1.7 | 69.1 ± 1.4 | 71.7 ± 1.0 | 79.9 ± 0.6 |
| $\chi^2$ | 61.6 ± 1.3 | 68.6 ± 1.8 | 71.9 ± 1.1 | 79.9 ± 0.7 |
| $L_1$ | 58.1 ± 1.2 | 65.6 ± 0.6 | 69.1 ± 0.8 | 77.4 ± 0.5 |

TABLE 12-continued

Classification Results (Percent) on Scene-15 Data Set

| Methods | Training images per class | | | |
|---|---|---|---|---|
| | 10 | 20 | 30 | 100 |
| $L_2$ | 50.2 ± 2.7 | 58.2 ± 1.9 | 62.4 ± 1.7 | 73.0 ± 0.6 |
| $L_{0.5}$ | 43.3 ± 1.5 | 48.4 ± 1.6 | 50.7 ± 2.0 | 52.9 ± 5.6 |
| $L_1$-BRD | 58.2 ± 1.1 | 65.6 ± 0.6 | 69.1 ± 0.8 | 77.4 ± 0.5 |
| HI | 58.1 ± 1.0 | 65.2 ± 1.2 | 69.1 ± 0.8 | 77.3 ± 0.6 |
| Hellinger | 59.4 ± 1.4 | 66.8 ± 1.0 | 69.9 ± 1.0 | 78.6 ± 0.7 |

Object Recognition

Caltech-101 data set is an important benchmark data set for object recognition. This contains 9,144 images under 102 categories (101 diverse classes and one background class). The number of images per class varies from 31 to 800. These images exhibit high intra-class variation and they also vary in dimensions. Hence, the images were resized to have the minimum dimension of 256 pixels (while maintaining the aspect ratio). 6 template configurations of the PRICoLBP were used along with two scales (radius of neighbors: 1,2), which results in 7,080 dimension feature.

Table 13 shows the recognition accuracy of the different methods for varying number of training images. One can observe that the results of the PBR distance kernel is comparable to other distance measure based kernels.

TABLE 13

Recognition Results (Percent) on Caltech-101 Data Set

| Methods | Training images per class | | |
|---|---|---|---|
| | 10 | 20 | 30 |
| PBR | 36.42 | 44.08 | 49.16 |
| BD | 36.27 | 43.88 | 48.73 |

TABLE 13-continued

Recognition Results (Percent) on Caltech-101 Data Set

| Methods | Training images per class | | |
|---|---|---|---|
| | 10 | 20 | 30 |
| JD | 36.33 | 43.98 | 49.15 |
| $\chi^2$ | 36.22 | 44.03 | 49.10 |
| $L_1$ | 31.71 | 39.00 | 44.18 |
| $L_2$ | 24.58 | 31.27 | 35.65 |
| $L_1$-BRD | 31.70 | 39.00 | 44.18 |
| HI | 31.64 | 38.96 | 44.07 |
| Hellinger | 32.99 | 40.54 | 45.88 |

Species Recognition

The Leeds Butterfly data set consists of 832 images in total for 10 categories (species) of butterflies. The number of images in each category ranges from 55 to 100. They vary in terms of illumination, pose and dimensions. The images were resized to have the minimum dimension of 256 pixels (while maintaining the aspect ratio). The same setting of PRICoLBP was used as for the texture data sets. Table 14 shows the recognition accuracy of the different methods on the Leeds Butterfly data set for a varying number of training images. It can be observed that PBR kernel achieves comparable performance compared to other distance measure based kernels.

TABLE 14

Recognition Results (Percent) on Leeds Butterfly Data Set

| Methods | Training images per class | | | |
|---|---|---|---|---|
| | 10 | 20 | 30 | 40 |
| PBR | 90.8 ± 1.6 | 94.5 ± 0.8 | 95.7 ± 0.7 | 97.5 ± 0.9 |
| BD | 90.2 ± 1.6 | 94.0 ± 1.1 | 95.0 ± 0.6 | 97.0 ± 0.8 |
| JD | 89.7 ± 2.4 | 94.4 ± 0.8 | 95.5 ± 0.6 | 97.2 ± 1.0 |
| $\chi^2$ | 89.7 ± 2.4 | 94.4 ± 1.2 | 95.6 ± 0.8 | 97.5 ± 0.8 |
| $L_1$ | 88.3 ± 1.3 | 92.9 ± 1.2 | 94.9 ± 0.9 | 96.6 ± 1.4 |
| $L_2$ | 82.6 ± 2.3 | 88.5 ± 1.1 | 91.6 ± 1.3 | 93.7 ± 1.9 |
| $L_{0.5}$ | 68.9 ± 2.3 | 73.4 ± 2.2 | 74.7 ± 2.2 | 77.1 ± 1.8 |
| $L_1$-BRD | 88.3 ± 1.2 | 92.9 ± 1.2 | 94.9 ± 0.9 | 96.6 ± 1.4 |
| HI | 88.0 ± 2.4 | 93.0 ± 1.0 | 95.0 ± 0.9 | 96.7 ± 1.4 |
| Hellinger | 89.1 ± 1.2 | 93.2 ± 1.2 | 94.4 ± 1.2 | 96.8 ± 1.2 |

Thus, a number of preferred embodiments have been fully described above with reference to the drawing figures. According to aspects of the present invention, systems and methods are provided that can improve the computational efficiency, speed and accuracy of image recognition systems. Applications of the present invention include medical systems such as medical diagnosis machines, DNA sequencing machines, surgical robots, and other imaging systems. Other applications could include machines for verifying biometric signature, criminal investigation systems, such as finger print identification systems or face recognition systems. The skilled person may recognize other new and useful applications of the above-described inventions.

Although the invention has been described based upon these preferred embodiments, it would be apparent to those of skill in the art that certain modifications, variations, and alternative constructions could be made to the described embodiments within the spirit and scope of the invention.

For example, users could be classified by, for example, user profiles, and matching could be limited to users having a specified user profile.

REFERENCES

The following publicly available publications were referenced above by number [#] and form part of the application. The relevant contents of which are hereby incorporated by reference, which should be readily understood from the context and manner of the reference.

[1] N. Sebe, M. S. Lew, and D. P. Huijsmans, "Toward Improved Ranking Metrics," Pattern Analysis and Machine Intelligence, IEEE Transactions on, vol. 22, no. 10, pp. 1132-1143, 2000.

[2] W. Dong, L. Huchuan, and Y. Ming-Hsuan, "Least Soft-Threshold Squares Tracking," in Proc. IEEE Conference on Computer Vision and Pattern Recognition, 23-28 June 2013 2013, pp. 2371-2378.

[3] G. Healey and R. Kondepudy, "Radiometric CCD Camera Calibration and Noise Estimation," Pattern Analysis and Machine Intelligence, IEEE Transactions on, vol. 16, no. 3, pp. 267-276, March 1994.

[4] J. R. Janesick, Scientific Charge-Coupled Devices. Bellingham, Wash.: SPIE, 2001.

[5] C.-H. Lin, J.-S. Tsai, and C.-T. Chiu, "Switching Bilateral Filter With a Texture/Noise Detector for Universal Noise Removal," Image Processing, IEEE Transactions on, vol. 19, no. 9, pp. 2307-2320, 2010.

[6] C. Liu, R. Szeliski, S. B. Kang, C. L. Zitnick, and W. T. Freeman, "Automatic Estimation and Removal of Noise from a Single Image," IEEE Transactions on Pattern Analysis and Machine Intelligence, vol. 30, no. 2, pp. 299-314, 2008.

[7] N. Young and A. Evans, "Spatio-Temporal Attribute Morphology Filters for Noise Reduction in Image Sequences," in Proc. International Conference on Image Processing, vol. 1, 2003, pp. I-333-6.

[8] P. H. Westfall and K. S. S. Henning, Understanding Advanced Statistical Methods. Boca Raton, Fla., USA: CRC Press, 2013.

[9] A. Tversky and I. Gati, "Similarity, Separability, and the Triangle Inequality," Psychological review, vol. 89, no. 2, p. 123, 1982.

[10] W. J. Scheirer, M. J. Wilber, M. Eckmann, and T. E. Boult, "Good Recognition is Non-Metric," Computing Research Repository, vol. abs/1302.4673, 2013.

[11] K. Beyer, J. Goldstein, R. Ramakrishnan, and U. Shaft, "When Is "Nearest Neighbor" Meaningful?" in Database Theory ICDT99, ser. Lecture Notes in Computer Science, C. Beeriand P. Buneman, Eds. Springer Berlin Heidelberg, 1999, vol. 1540, pp. 217-235.

[12] C. Aggarwal, A. Hinneburg, and D. Keim, "On the Surprising Behavior of Distance Metrics in High Dimensional Space," in Database Theory ICDT 2001, ser. Lecture Notes in Computer Science, J. Bussche and V. Vianu, Eds. Springer Berlin Heidelberg, 2001, vol. 1973, pp. 420-434.

[13] M. Donahue, D. Geiger, R. Hummel, and T.-L. Liu, "Sparse Representations for Image Decomposition with Occlusions," in Proc. IEEE Computer Society Conference on Computer Vision and Pattern Recognition, June 1996, pp. 7-12.

[14] D. W. Jacobs, D. Weinshall, and Y. Gdalyahu, "Classification with Nonmetric Distances: Image Retrieval and Class Representation," IEEE Trans. Pattern Anal. Mach. Intell., vol. 22, no. 6, pp. 583-600, 2000.

[15] P. Howarth and S. Rger, "Fractional Distance Measures for Content-Based Image Retrieval," in Advances in Information Retrieval, ser. Lecture Notes in Computer

[16] K.-S. Goh, B. Li, and E. Chang, "DynDex: A Dynamic and Non-metric Space Indexer," in Proc. Tenth ACM International Conference on Multimedia. New York, N.Y., USA: ACM, 2002, pp. 466-475.

[17] Y. Rubner, J. Puzicha C. Tomasi, and J. M. Buhmann, "Empirical Evaluation of Dissimilarity Measures for Color and Texture," Computer Vision and Image Understanding, vol. 84, no. 1, pp. 25-43, 2001.

[18] A. Marzal and E. Vidal, "Computation of Normalized Edit Distance and Applications," Pattern Analysis and Machine Intelligence, IEEE Transactions on, vol. 15, no. 9, pp. 926-932, 1993.

[19] L. Le Cam, "An approximation theorem for the poisson binomial distribution," Pacific Journal of Mathematics, vol. 10(4), pp. 1181-1197, 1960.

[20] H. Shen, N. Zamboni, M. Heinonen, and J. Rousu, "Metabolite Identification through Machine Learning— Tackling CASMI Challenge Using FingerID," Metabolites, vol. 3, no. 2, pp. 484-505, 2013.

[21] A. C. W. Lai, A. N. N. Ba, and A. M. Moses, "Predicting Kinase Substrates Using Conservation of Local Motif Density," Bioinformatics, vol. 28, no. 7, pp. 962-969, 2012.

[22] A. Niida, S. Imoto, T. Shimamura, and S. Miyano, "Statistical Model-Based Testing to Evaluate the Recurrence of Genomic Aberrations," Bioinformatics, vol. 28, no. 12, pp. i115-i120, 2012.

[23] J.-B. Cazier, C. C. Holmes, and J. Broxholme, "GREVE: Genomic Recurrent Event ViEwer to Assist the Identification of Patterns Across Individual Cancer Samples," Bioinformatics, vol. 28, no. 22, pp. 2981-2982, 2012.

[24] H. Zhou, M. E. Sehl, J. S. Sinsheimer, and K. Lange, "Association Screening of Common and Rare Genetic Variants by Penalized Regression," Bioinformatics, vol. 26, no. 19, pp. 2375-2382, 2010.

[25] A. Wilm, P. P. K. Aw, D. Bertrand, G. H. T. Yeo, S. H. Ong, C. H. Wong, C. C. Khor, R. Petric, M. L. Hibberd, and N. Nagarajan, "LoFreq: a Sequence-Quality Aware, Ultra-Sensitive Variant Caller for Uncovering Cell-Population Heterogeneity from High-Throughput Sequencing Datasets," Nucleic Acids Research, vol. 40, no. 22, pp. 11 189-11 201, 2012.

[26] A. S. Macdonald, Encyclopedia of Actuarial Science, J. L. Teugels and B. Sundt, Eds. John Wiley & Sons, Ltd, Chichester, 2004.

[27] H. U. Gerber, "A Proof of the Schuette-Nesbitt Formula for Dependent Events," Actuarial Research Clearing House, vol. 1, pp. 9-10, 1979.

[28] Y. Hwang, J.-S. Kim, and I.-S. Kweon, "Difference-Based Image Noise Modeling Using Skellam Distribution," Pattern Analysis and Machine Intelligence, IEEE Transactions on, vol. 34, no. 7, pp. 1329-1341, July 2012.

[29] J. Darroch, "On the Distribution of the Number of Successes in Independent Trials," The Annals of Mathematical Statistics, vol. 35, pp. 1317-1321, 1964.

[30] J.-B. Baillon, R. Cominetti, and J. Vaisman, "A Sharp Uniform Bound for the Distribution of Sums of Bernoulli Trials," arXiv preprint arXiv:0arX.2350v4, 2013.

[31] V. N. Gudivada and V. V. Raghavan, "Content Based Image Retrieval Systems," Computer, vol. 28, no. 9, pp. 18-22, 1995.

[32] M. Arakeri and G. Ram Mohana Reddy, "An Intelligent Content-Based Image Retrieval System for Clinical Decision Support in Brain Tumor Diagnosis," International Journal of Multimedia Information Retrieval, vol. 2, no. 3, pp. 175-188, 2013.

[33] J. Kalpathy-Cramer and W. Hersh, "Automatic Image Modality Based Classification and Annotation to Improve Medical Image Retrieval," Stud Health Technol Inform, vol. 129, no. Pt 2, pp. 1334-8, 2007.

[34] B. Marshall, "Discovering Robustness Amongst CBIR Features," International Journal of Web & Semantic Technology (IJWesT), vol. 3, no. 2, pp. 19-31, April 2012.

[35] O. Boiman, E. Shechtman, and M. Irani, "In Defense of Nearest-Neighbor Based Image Classification," in Proc. IEEE Conf. Computer Vision and Pattern Recognition, June 2008, pp. 1-8.

[36] W. Zhang, J. Sun, and X. Tang, "Cat Head Detection—How to Effectively Exploit Shape and Texture Features," in Proc. Of European Conf. Computer Vision, 2008, pp. 802-816.

[37] Z. Weiwei, S. Jian, and T. Xiaoou, "From Tiger to Panda: Animal Head Detection," Image Processing, IEEE Transactions on, vol. 20, no. 6, pp. 1696-1708, 2011

[38] T. Kozakaya, S. Ito, S. Kubota, and O. Yamaguchi, "Cat Face Detection with Two Heterogeneous Features," in Proc. IEEE International Conference on Image Processing, 2009, pp. 1213-1216.

[39] H. Bo, "A Novel Features Design Method for Cat Head Detection," in Artificial Intelligence and Computational Intelligence, ser. Lecture Notes in Computer Science. Springer Berlin Heidelberg, 2010, vol. 6319, ch. 47, pp. 397-405.

[40] G. B. Huang, M. Ramesh, T. Berg, and E. Learned-Miller, "Labeled Faces in the Wild: A Database for Studying Face Recognition in Unconstrained Environments," University of Massachusetts, Amherst, Tech. Rep. 07-49, October 2007.

[41] N. Dalai and B. Triggs, "Histograms of Oriented Gradients for Human Detection," in Proc. IEEE Computer Society Conference on Computer Vision and Pattern Recognition, vol. 1, 2005, pp. 886-893.

[42] Y. Mitani and Y. Hamamoto, "A Local Mean-Based Nonparametric Classifier," Pattern Recognition Letters, vol. 27, no. 10, pp. 1151-1159, 2006.

[43] P. Dollar, C. Wojek, B. Schiele, and P. Perona, "Pedestrian Detection: An Evaluation of the State of the Art," Pattern Analysis and Machine Intelligence, IEEE Transactions on, vol. 34, no. 4, pp. 743-761, 2012.

[44] A. Kembhavi, D. Harwood, and L. S. Davis, "Vehicle Detection Using Partial Least Squares," Pattern Analysis and Machine Intelligence, IEEE Transactions on, vol. 33, no. 6, pp. 1250-1265, 2011.

[45] M. Kaaniche and F. Br'emond, "Recognizing Gestures by Learning Local Motion Signatures of HOG Descriptors," Pattern Analysis and Machine Intelligence, IEEE Transactions on, vol. 34, no. 11, pp. 2247-2258, 2012.

[46] O. Ludwig, D. Delgado, V. Goncalves, and U. Nunes, "Trainable Classifier-Fusion Schemes: An Application to Pedestrian Detection," in Proc. 12th International IEEE Conference on Intelligent Transportation Systems, 2009, pp. 1-6.

[47] A. Kl"ockner, N. Pinto, Y. Lee, B. Catanzaro, P. Ivanov, and A. Fasih, "PyCUDA and PyOpenCL: A Scripting-Based Approach to GPU Run-Time Code Generation," Parallel Computing, vol. 38, no. 3, pp. 157-174, 2012.

[48] O. Chapelle, V. Vapnik, O. Bousquet, and S. Mukherjee, "Choosing Multiple Parameters for Support Vector Machines," Machine Learning, vol. 46, no. 1-3, pp. 131-159, 2002.

[49] F. Friedrichs and C. Igel, "Evolutionary Tuning of Multiple SVM Parameters," Neurocomputing, vol. 64, no. 0, pp. 107-117, 2005.

[50] S.-W. Lin, Z.-J. Lee, S.-C. Chen, and T.-Y. Tseng, "Parameter Determination of Support Vector Machine and Feature Selection Using Simulated Annealing Approach," Applied Soft Computing, vol. 8, no. 4, pp. 1505-1512, 2008.

[51] E. Fix and J. Hodges Jr, "Discriminatory Analysis, Nonparametric Discrimination: Consistency Properties," USAF School of Aviation Medicine, Randolph Field, Tex., Project 21-49-004, Rept. 4, Contract AF41 (128)-31, Tech. Rep., February 1951.

[52] X. Wu, V. Kumar, J. Ross Quinlan, J. Ghosh, Q. Yang, H. Motoda, G. McLachlan, A. Ng, B. Liu, P. Yu, Z.-H. Zhou, M. Steinbach, D. Hand, and D. Steinberg, "Top 10 Algorithms in Data Mining," Knowledge and Information Systems, vol. 14, no. 1, pp. 1-37, 2008.

[53] K. Fukunaga, Introduction to Statistical Pattern Recognition ($2^{nd}$ ed.). San Diego, Calif., USA: Academic Press Professional, Inc., 1990.

[54] A. K. Ghosh, "On Optimum Choice of k in Nearest Neighbor Classification," Computational Statistics & Data Analysis, vol. 50, no. 11, pp. 3113-3123, 2006.

[55] G. Toussaint, "Bibliography on Estimation of Misclassification," Information Theory, IEEE Transactions on, vol. 20, no. 4, pp. 472-479, 1974.

[56] B. Dasarathy, Nearest Neighbor (NN) Norms: NN Pattern Classification Techniques. Washington: IEEE Computer Society, 1991.

[57] V. Mnih, "CUDAMat: A CUDA-Based Matrix Class for Python," Technical Report UTML TR 2009-004, Department of Computer Science, University of Toronto, Tech. Rep., November 2009.

[58] K. Chang, K. W. Bowyer, S. Sarkar, and B. Victor, "Comparison and Combination of Ear and Face Images in Appearance-Based Biometrics," IEEE Transactions on Pattern Analysis and Machine Intelligence, vol. 25, pp. 1160-1165, 2003.

[59] M. Burge and W. Burger, "Ear Biometrics in Computer Vision," in Proc. 15th International Conference on Pattern Recognition, vol. 2, 2000, pp. 822-826 vol. 2.

[60] H. Galbally and A. Fierrez, "On the Vulnerability of Fingerprint Verification Systems to Fake Fingerprints Attacks," in Proc. 40th Annual IEEE International Carnahan Conferences Security Technology, USA, 2006, pp. 130-136.

[61] A. Iannarelli, Ear Identification. California: Paramount Publishing Company, 1989.

[62] H. Nejati, L. Zhang, T. Sim, E. Martinez-Marroquin, and G. Dong, "Wonder Ears: Identification of Identical Twins from Ear Images," in Proc. 21st International Conference on Pattern Recognition, November 2012, pp. 1201-1204.

[63] A. Kumar and C. Wu, "Automated Human Identification Using Ear Imaging," Pattern Recognition, vol. 45, no. 3, pp. 956-968, 2012.

[64] R. Bolle, J. Connell, S. Pankanti, N. Ratha, and A. Senior, "The Relation Between the ROC Curve and the CMC," in Proc. Fourth IEEE Workshop on Automatic Identification Advanced Technologies, October 2005, pp. 15-20.

[65] I. Steinwart, D. Hush, and C. Scovel, "Learning from Dependent Observations," Journal of Multivariate Analysis, vol. 100, no. 1, pp. 175-194, 2009.

[66] O. Chapelle, P. Haffner, and V. N. Vapnik, "Support Vector Machines for Histogram-Based Image Classification," Neural Networks, IEEE Transactions on, vol. 10, no. 5, pp. 1055-1064, 1999.

[67] P. Brodatz, Textures: A Photographic Album for Artists and Designers. Dover Pubns, 1966.

[68] E. Hayman, B. Caputo, M. Fritz, and J.-O. Eklundh, "On the Significance of Real-World Conditions for Material Classification," in Computer Vision-ECCV 2004. Springer, 2004, pp. 253-266.

[69] Y. Xu, H. Ji, and C. Fermüller, "Viewpoint Invariant Texture Description using Fractal Analysis," International Journal of Computer Vision, vol. 83, no. 1, pp. 85-100, 2009.

[70] G. Kylberg, "The kylberg texture dataset v. 1.0," Centre for Image Analysis, Swedish University of Agricultural Sciences and Uppsala University, Uppsala, Sweden, External report (Blue series) 35, September 2011. [Online]. Available: http://www.cb.uu.se/gustaf/texture/

[71] S. Lazebnik, C. Schmid, and J. Ponce, "Beyond Bags of Features: Spatial Pyramid Matching for Recognizing Natural Scene Categories," in Computer Vision and Pattern Recognition, 2006 IEEE Computer Society Conference on, vol. 2. IEEE, 2006, pp. 2169-2178.

[72] J. Wang, K. Markert, and M. Everingham, "Learning Models for Object Recognition from Natural Language Descriptions," in BMVC, vol. 1, 2009, p. 2.

[73] L. Sharan, R. Rosenholtz, and E. H. Adelson, "Accuracy and Speed of Material Categorization in Real-World Images," Journal of Vision, vol. 14, no. 10, 2014.

[74] O. J. O. Söderkvist, "Computer Vision Classification of Leaves from Swedish Trees," Master's thesis, Linköping University, SE-581 83 Linköping, Sweden, September 2001, liTH-ISY-EX-3132.

[75] L. Fei-Fei, R. Fergus, and P. Perona, "Learning Generative Visual Models from Few Training Examples: An Incremental Bayesian Approach Tested on 101 Object Categories," Computer Vision and Image Understanding, vol. 106, no. 1, pp. 59-70, 2007.

[76] X. Qi, R. Xiao, C. G. Li, Y. Qiao, J. Guo, and X. Tang, "Pairwise Rotation Invariant Co-Occurrence Local Binary Pattern," Pattern Analysis and Machine Intelligence, IEEE Transactions on, vol. 36, no. 11, pp. 2199-2213, 2014.

[77] A. Oliva and A. Torralba, "Modeling the Shape of the Scene: A Holistic Representation of the Spatial Envelope," International journal of computer vision, vol. 42, no. 3, pp. 145-175, 2001.

[78] L. Fei-Fei and P. Perona, "A Bayesian Hierarchical Model for Learning Natural Scene Categories," in Computer Vision and Pattern Recognition, 2005. CVPR 2005. IEEE Computer Society Conference on, vol. 2. IEEE, 2005, pp. 524-531.

We claim:

1. A computer-implemented method for classifying a digital image, the method comprising:

obtaining, from a host computer, feature data corresponding to the digital image, the feature data including an N-dimensional feature vector X such that $X=(a_1 \ldots a_N)$;

determining, by a graphics processing unit, a semi-metric distance based on a Poisson-Binomial distribution between the feature data and one or more reference feature data stored in a memory of the host computer, the reference feature data including an N-dimensional feature vector Y such that $Y=(b_1 \ldots b_N)$, the determination of the semi-metric distance (PBR(X,Y)) including calculating:

$$PBR(X, Y) = \frac{\sigma}{N - \mu} = \frac{\sqrt{\sum_{i=1}^{N} p_i(1 - p_i)}}{N - \sum_{i=1}^{N} p_i}$$

wherein N is an integer greater than 0,
σ is a standard deviation of vector X,
μ is a mean of vector X, and
$p_i$ is $|a_i-b_i|$; and
classifying the digital image using the determined semi-metric distance.

2. The method of claim 1, wherein classifying the digital image comprises using a support vector machines (SVM) classifier.

3. The method of claim 1, wherein classifying the digital image comprises using a k-nearest neighbor (kNN) classifier.

4. The method of claim 1, wherein the kNN classifier is an adaptive local mean-based k-nearest neighbors (ALM-kNN) classifier, wherein the value of the k-nearest neighbors (k) is adaptively chosen.

5. The method of claim 4, wherein the adaptive value of the k-nearest neighbors does not exceed a square root of a number of one or more reference data.

6. The method of claim 1, wherein the obtained feature data and the one or more reference feature data comprise Pairwise Rotation Invariant Co-occurrence Local Binary Pattern (PRICoLBP) data.

7. The method of claim 1, wherein the obtained feature data and the one or more reference feature data comprise Histogram of Oriented Gradients (HOG) data.

8. A computer-implemented method for classifying a digital image, the method comprising: obtaining feature data corresponding to a digital image; determining a semi-metric distance based on a Poisson-Binomial distribution between the obtained feature data and one or more reference feature data; and classifying the digital image using the determined semi-metric distance, wherein the digital image comprises information corresponding to a DNA or RNA sequence, and the obtained feature data comprises a vector X of sequencing quality proximities for a first DNA or RNA sample with a sequencing depth $d_x$ such that $X=(x_1 \ldots x_{dx})$ and the reference feature data comprises a vector Y of sequencing probabilities for a reference DNA or RNA sample with a sequencing depth $d_y$ such that $Y=(y_1 \ldots y_{dy})$, and wherein the determining the semi-metric distance ($PBR_{seq}$) comprises calculating:

$$PBR_{seq}(X, Y) = \frac{\sigma_X \sigma_Y}{|\mu_X - \mu_Y|},$$

wherein $\mu_X$ is a mean for vector X,
$\mu_Y$ is a mean for vector Y,
$\sigma_X$ is a standard deviation for vector X, and
$\sigma_Y$ is a standard deviation for vector Y.

9. The method of claim 8, wherein the classifying the digital image comprises:
determining whether the semi-metric distance ($PBR_{seq}$) is greater than a threshold value, and
classifying the DNA or RNA sequence as being a tumor or normal based on the determining if the semi-metric distance ($PBR_{seq}$) is greater than the threshold value.

10. The method of claim 8, wherein classifying the digital image comprises identifying a rare variant in the DNA or RNA sequence.

11. The method of claim 1, further comprising:
determining a closest matching reference feature data of the one or more reference feature data.

12. The method of claim 11, further comprising:
identifying a person based on the determined closest matching reference feature data, wherein the digital image comprises at least one of: an ear, a face, a fingerprint, and an iris.

13. A system for classifying a digital image comprising:
a host computer comprising a processor, wherein the host computer is coupled to a memory comprising one or more reference feature data; and
a graphics processing unit (GPU) comprising a processor, wherein the GPU is coupled to the host computer and is configured to:
obtain, from the host computer, feature data corresponding to the digital image, the feature data including an N-dimensional feature vector X such that $X=(a_1 \ldots a_N)$;
access, from the memory, the reference feature data, the reference feature data including an N-dimensional feature vector Y such that $Y=(b_1 \ldots b_N)$;
wherein the host computer is configured to:
determine a semi-metric distance (PBR(X,Y)):

$$PBR(X, Y) = \frac{\sigma}{N - \mu} = \frac{\sqrt{\sum_{i=1}^{N} p_i(1 - p_i)}}{N - \sum_{i=1}^{N} p_i}$$

where N is an integer greater than 0,
σ is a standard deviation of vector X,
μ is a mean of vector X, and
$p_i$ is $|a_i-b_i|$; and
classify the digital image using the determined semi-metric distance.

14. The system of claim 13, wherein the host computer is further configured to classify the digital image using a support vector machines (SVM) classifier.

15. The system of claim 13, wherein the host computer is further configured to classify the digital image using a k-nearest neighbor (kNN) classifier.

16. The system of claim 15, wherein the kNN classifier is an adaptive local mean-based k-nearest neighbors (ALM-kNN) classifier, wherein the value of the k-nearest neighbors (k) is adaptively chosen.

17. The system of claim 16, wherein the adaptive value of the k-nearest neighbors (k) does not a square root of a number of one or more reference data.

18. The system of claim 13, wherein the feature data and the one or more reference feature data comprise Pairwise Rotation Invariant Co-occurrence Local Binary Pattern (PRICoLBP) data.

19. The system of claim 13, wherein the obtained feature data and the one or more reference feature data comprise Histogram of Oriented Gradients (HOG) data.

20. A digital image classifying system, comprising: at least one processor; and a memory in communication with the at least one processor, the system configured to: obtain feature data corresponding to a digital image; determine a semi-metric distance based on a Poisson-Binomial distribution between the obtained feature data and one or more reference feature data; and classify the digital image using the determined semi-metric distance, wherein the digital image comprises information corresponding to a DNA or RNA sequence, and the feature data comprises a vector X of sequencing quality proximities for a first DNA or RNA sample with a sequencing depth $d_x$ such that $X=(x_1 \ldots x_{dx})$ and the reference feature data comprises a vector Y of sequencing probabilities for a reference DNA or RNA sample with a sequencing depth $d_y$ such that $Y=(y_1 \ldots y_{dy})$, and wherein determining the semi-metric distance ($PBR_{seq}$) comprises calculating:

$$PBR_{seq}(X, Y) = \frac{\sigma_X \sigma_Y}{|\mu_X - \mu_Y|},$$

wherein $PBR_{seq}(X, Y)$ is a Poisson-Binomial Radius (PBR) distance between the vector X and the vector Y,
$\mu_X$ is a mean for vector X,
$\mu_Y$ is a mean for vector Y,
$\sigma_X$ is a standard deviation for vector X, and
$\sigma_Y$ is a standard deviation for vector Y.

21. The system of claim 20, wherein the system is further configured to:
determine whether the semi-metric distance ($PBR_{seq}$) is greater than a threshold value, and
classify the DNA or RNA sequence as being a tumor or normal based on the determining if the semi-metric distance ($PBR_{seq}$) is greater than the threshold value.

22. The system of claim 20, wherein the system is further configured to:
identify a rare variant in the DNA or RNA sequence.

23. The system of claim 13, wherein the host computer is further configured to:
determine a closest matching reference feature data of the one or more reference feature data.

24. The system of claim 23, wherein the host computer is further configured to:
identify a person based on the determined closest matching reference feature data, wherein the digital image comprises at least one of: an ear, a face, a fingerprint, and an iris.

* * * * *